United States Patent
Dan et al.

(10) Patent No.: US 7,003,528 B2
(45) Date of Patent: *Feb. 21, 2006

(54) METHOD AND SYSTEM FOR WEB MANAGEMENT

(75) Inventors: Noah Dan, Potomac, MD (US); Albert C. Brown, Golden, CO (US)

(73) Assignee: 3565 Acquisition, LLC, Costa Mesa, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 10/354,909

(22) Filed: Jan. 29, 2003

(65) Prior Publication Data

US 2003/0217117 A1    Nov. 20, 2003

Related U.S. Application Data

(63) Continuation of application No. 09/249,061, filed on Feb. 12, 1999, now Pat. No. 6,560,639.

(60) Provisional application No. 60/074,684, filed on Feb. 13, 1998.

(51) Int. Cl.
*G06F 17/00* (2006.01)

(52) U.S. Cl. .................. 707/102; 707/10; 709/217; 709/218; 709/219; 709/223; 709/224; 709/225; 709/229; 709/230; 709/231; 709/232; 709/233

(58) Field of Classification Search ........ 709/217–219; 707/10, 102, 223–225, 229–233
See application file for complete search history.

(56) References Cited

U.S. PATENT DOCUMENTS

| | | | |
|---|---|---|---|
| 5,109,404 A | | 4/1992 | Katz et al. |
| 5,163,131 A | | 11/1992 | Row et al. |
| 5,689,699 A * | 11/1997 | Howell et al. ................. 707/9 |
| 5,812,995 A * | 9/1998 | Sasaki et al. .................. 707/1 |
| 5,826,031 A * | 10/1998 | Nielsen ...................... 709/233 |
| 5,835,087 A * | 11/1998 | Herz et al. .................. 345/810 |
| 5,835,758 A * | 11/1998 | Nochur et al. ............. 707/102 |
| 5,838,458 A * | 11/1998 | Tsai ............................ 358/402 |
| 5,845,067 A * | 12/1998 | Porter et al. ................ 713/200 |
| 5,870,552 A | 2/1999 | Dozier et al. |
| 5,930,792 A * | 7/1999 | Polcyn .......................... 707/9 |
| 6,016,344 A | 1/2000 | Katz |
| 6,026,433 A * | 2/2000 | D'Arlach et al. .......... 709/217 |
| 6,192,382 B1 * | 2/2001 | Lafer et al. ................. 707/513 |
| 6,209,036 B1 * | 3/2001 | Aldred et al. .............. 709/229 |
| 6,237,099 B1 * | 5/2001 | Kurokawa .................. 713/200 |
| 6,249,291 B1 * | 6/2001 | Popp et al. ................. 345/473 |
| 6,256,712 B1 * | 7/2001 | Challenger et al. ......... 711/141 |
| 6,311,185 B1 * | 10/2001 | Markowitz et al. .......... 707/10 |
| 6,457,017 B1 * | 9/2002 | Watkins et al. ......... 707/103 R |

(Continued)

FOREIGN PATENT DOCUMENTS

WO      WO 00/20945      4/2000

OTHER PUBLICATIONS

"The Business One Irwin Handbook of Telecommunications," by James Harry Green, Second Edition, 1989 and 1992, (Table of Contents).

(Continued)

*Primary Examiner*—Nabil El-Hady
(74) *Attorney, Agent, or Firm*—Knobbe, Martens, Olson & Bear, LLP

(57) ABSTRACT

A web management system including a file system caching web pages in a web site. The web management system parses attributes to generate the web pages and stores the web pages in the file system.

16 Claims, 25 Drawing Sheets

U.S. PATENT DOCUMENTS

| | | |
|---|---|---|
| 6,560,639 B1 * | 5/2003 | Dan et al. .................... 709/218 |
| 2002/0021935 A1 * | 2/2002 | Li |
| 2002/0032839 A1 * | 3/2002 | Yamamoto |

OTHER PUBLICATIONS

"Computer Organization and Architecture," by William Stallings, Third Edition, 1993, (Table of Contents).

"Data Communications Principles," by Gitlin et al., 1992, (Table of Contents).

"Data Network Design," by Darren L. Spohn, 1993, (Table of Contents).

Gellersen, Hans-Werner, Robert Wicke and Martin Gaedke. "WebComposition: An Object-Oriented Support System for the Web Engineering Lifecycle." *Computer Networks and ISDN Systems 29*, Elsevier Science B.V., 1997, pp. 1429-1437.

"What is Content Management?" *Vignette*, Vignette Corporation, 2001. wysiwyg://65/http://www.vignette.com/CDA/Site/0,2907.1.1.1329-2067-1337-21765.00.html.

Reynolds, Jim and Arminder Kaur. "Content Management." Apr. 2000, Version 1.0. wysiwyg://32/http://www.microsoft.com/technet/ecommerce/contmgt.asp?a=printable.

Challenger, Jim, Arun Iyengar, Karen Witting, Cameron Ferstat and Paul Reed. "A Publishing System for Efficiently Creating Dynamic Web Content." *IEEE INFOCOM 2000*. pp. 844-853.

Boxer, Aaron. "Where Buses Cannot Go." *IEEE Spectrum*, Feb. 1995, pp. 41-45.

Barroso, Luiz André, Sasan Iman, Jaecheon Jeong, Koray Öner, Michael Dubois and Krishnan Ramamurthy. "RPM: A Rapid Prototyping Engine for Multiprocessor Systems." *IEEE*, 1995, pp. 26-34.

\* cited by examiner

Θ-grail

Content Create | Admin

Site: patest ∂ ○ ×
Egrail: Info
Panels (shortcuts to:)
- All Commands Panel
- Assets Panel
- Page Panel
- Help Strings Panel Site
- Switch Site Template
- Background Colors
- Header & Footer
- Type & Styles
- Site Preferences
- Archive Contents Page
- New Page - expert
- New Page - wizard
- Panel
- Page Dump
- Change Template Assets
- New Asset
- New Folder
- Assets Panel Template
- New
- Modify
- Object Defaults Object
- New
- Modify
- Content Objects Forums
- New Forum Help system
- New String
- Panel
- Update Subnav Template

*E-grail*
*Basic Template Grid*

| | TD | TD | TD | TD | TD | TD |
|---|---|---|---|---|---|---|
| TR 1 | TD1 | TD2 | 3 | 4 | TD5 | 6 |
| TR 2 | T | TD 8 LOG | 9 | | TD 10 & 11 (TD COLSPAN="2") AD | 12 |
| TR 3 | 13 | 14 | 15 | 16 | 17 | 18 |
| TR 4 | 19 | TD20 SUBNAV | 21 | 22 | TD 23 CONTENTS CONTENT SPACER | 24 |
| TR 5 | 25 | 26 | 27 | 28 | 29 | 30 |
| TR 6 | 31 | TD32 BUTTONS | 33 | | 34 (TD COLSPAN="2") | 35 |
| TR 7 | 36 | 37 | 38 | 39 | 40 | 41 |
| TR 8 | 42 | | | | TD 43 (TD COLSPAN="4") | 44 |
| TR 9 | 45 | 46 | 47 | 48 | 49 | 50 |

Core Page Fields

- 475 — Name — Home Page
- 480 — Title — Home Page
- 485 — Parent — New Directory
- 490 — Url — /index.html
- 500 — Description — Home Page
- 505 — Owner — nash@egrailworks.com

Page Fields

- 510 — Sort Priority — 20
- 515 — Subnav — Collapsable
- 520 — Template — EG Zippy V.16
- 525 — Image — None
- 530 — Forum — None
- 535 — Attach Asset Folder — None
- Form Enter — Any
- Form List — Any

Url Options

- 540 — External Link — No
- 545 — URL Method — Normal

Content

550 — Content

555 —
Congratulations! You now have your very own web site.
You will notice that it is already populated with pages in Latin. We thought that in the beginning it would be helpful to have some filler contents to orient you and E-Grail's architectural possibilities.
These pages can be deleted or modified very easily.

<H2>Click here for an outline step-by-step <A HREF="javascript:OpenWindow('http://www.Grailm.com/mon/')"><FONT COLOR=BROWN>Tutorial and Help site</Font></A></

E-Grail was designed for form use edn can be used by people with very little experience in web production. But even as a "newbie," you'll have to know your own operating system some of the general basics about the web and the Internet. You'll also need the current browser software and a minimal connect speed of 28.6K to operate E-Grail efficiently.

Questions and comments should be addressed to our webmaster at: <A HREF="mailto:support@egrail.com">support@egrail.com</A>

<-- spacer element -->
<BR><IMG SRC=AssetUrl[clear] WIDTH="1" HEIGHT="15"><BR>
</TD>
<td width=5></td>
</TR>
<TABLE>

Related Links

560 — Cat — Any / Test Page / phitippe

565 — New Cat

570 — Keywords

Objects

Footer — No

Widgets

575 — Show — No

Security

580 — Group — Main

Group — None

Lock Page

Subpages — No

Rebuild Options

590 — Rebuild Navigation — Yes
585 — Make Page — Yes

Add

METHOD AND SYSTEM FOR WEB MANAGEMENT

RELATED APPLICATIONS

This is a continuation application of U.S. patent application Ser. No. 09/249,061, filed Feb. 12, 1999, now U.S. Pat. No. 6,560,639, which claims priority from U.S. Provisional Application Ser. No. 60/074,684, filed Feb. 13, 1998, which are incorporated herein by reference in their entirety.

The present application includes an ILLUSTRATIVE FUNCTION LIST FOR SOFTWARE. The ILLUSTRATIVE FUNCTION LIST FOR SOFTWARE is provided in electronic format on duplicate copies of a CD-ROM marked "Copy 1" and "Copy 2". The duplicate copies of the CD-ROM each contain a file entitled DNW-4725_ASCII_FORMAT.TXT created on Sept. 19, 2002 which is 254,858 bytes in size. The information on these duplicate CD-ROMs is incorporated herein by reference in its entirety. The copyright owner has no objection to the reproduction of this code listing as part of this patent document, but reserves all other copyrights whatsoever.

FIELD OF THE INVENTION

The invention relates, in general, to a method and system for managing a site on a computer network, and in particular, to a method and system for integrating site architecture, navigation, design, and management, for example, of a World Wide Web site on the Internet from a web server side.

BACKGROUND OF THE INVENTION

In the past few years, corporations have been busy building their World Wide Web sites. While creating web pages is a relatively simple task, adding fresh content and managing a web site to ward off information obsolescence is not simple at all.

On the contrary, managing content on a busy World Wide Web site is an increasingly complex problem. As a web site grows, the likelihood of anyone being able to keep links, navigation, and functions updated is minuscule. This is not for lack of effort or resources, but rather because of the exponentially growing number of links and elements that need refreshing with every new addition. No amount of individual page redesign can make up for the basic need of a real structural fix. Unless preemptive steps are taken, maintenance will soon consume the lion's share of all site resources. Costing between $250,000 and $500,000 annually, manually managing changes to a web site will drain even the deepest pockets. The magnitude of the cost is an important consideration for corporations, particularly because monetary returns from a web site cannot always be easily measured from an accounting standpoint.

Software solutions at the high end of the market include $50,000 to $100,000 middle-ware and software packages and may require equally expensive hardware configurations. As a result, such software programs serve only the corporate elite and the high-tech industry. Examples of such software solutions include StoryServer software produced by Vignette Corporation of Austin, Tex.

Software solutions at the low end of the market are hypertext markup language (HTML) editors with server plug-ins and software packages that try to emulate server functions from a user's desktop. These solutions try to perform some management tasks, but cannot manage content. At best, they merely rearrange files on the web server from a remote desktop.

Applicants have recognized a need in the industry for an elegant, simple, powerful, and inexpensive content management tool. That is, Applicants have determined that corporations and other users need a platform-independent, server-side software package that allows users to design and manage simple web sites to complex, database-driven web sites.

Applicants have determined that it would be desirable to have a method and/or system that permits users to interface with a web management tool through, for example, an Internet browser without a client-side application, thereby eliminating the need for users to buy and master additional software. Applicants have recognized that such a system could advantageously reside, for example, at an Internet service provider to eliminate the cost of shrink-wrapping and to facilitate optional automatic on-line software upgrades.

SUMMARY OF THE INVENTION

It is, therefore, a feature and advantage of the instant invention to provide an elegant, simple, powerful, and inexpensive content management tool. That is, the instant invention advantageously includes an optionally platform-independent, server-side software package that allows users to design and manage simple web sites to complex, database-driven web sites. To this extent, it is a feature and advantage of the present invention to be employable from small web sites to the most complex database-driven corporate web sites featuring asset management, forums, chat rooms, virtual shopping carts, calculators, statistics reports, etc.

It is another feature and advantage of the instant invention to provide a method and/or system that permits users to interface with a web management tool through, for example, an Internet browser or other tool, thereby eliminating the need for users to buy and master additional software. By extension, it is a feature and advantage of the present invention to eliminate the need for a proprietary client-side application interface, thereby promoting platform independence. Further, it is a feature and advantage of the instant invention to be a server-side application usable with any major platform and with any server software.

It is further a feature and advantage of the instant invention to provide a system that can advantageously reside at, for example, an Internet service provider to eliminate the cost of shrink-wrapping and to facilitate optional automatic on-line software upgrades. Additionally, it is a feature and advantage of the instant invention to provide a method and/or system that allows a user to create and review changes to a web page directly on the World Wide Web and/or in real-time. A real-time change, within the scope of this invention, includes simultaneous, substantially simultaneous, contemporaneous, and/or substantially contemporaneous changes.

More specifically, the instant invention provides a web management system. The system includes a file system caching all web pages in a web site. The web pages so cached may be at least partially static. The system also includes a web server communicating with the file system.

The web site management system may optionally include a database having a directory structure associating each page or web page of a site or web site with attributes thereof. The system may optionally include a server-side front end daemon communicatable with the web server and the database.

The server-side front end or other part of the system may identify the attributes of any user-changed page or web page and/or store the attributes of any user-changed page or web page in the database.

The web management system may further include a server-side back end daemon communicatable with the database and the file system. The back end daemon may parse the attributes to generate at least partially static web pages and may store the generated web pages in the file system.

The front end daemon may include at least one of the following components. An optional user manager may create a hierarchy of group access and/or user access to the pages or web pages and/or available editing options for the web pages. An asset manager may find, upload and/or organize one or more assets, each including a binary file. An optional page manager may create new web pages, modify existing web pages with available web page attributes, and/or tie the web pages to web site architecture and navigation. An optional sub-directory navigation manager may display the web pages in a collapsible, indented, or tabular directory.

The front end daemon may include an optional forum manager that may create, attach, and/or manage at least one interactive posting environment. An optional help manager may create, modify, attach, and/or manage at least one local help link to a command or field name. An optional utilities manager may include one or more management utilities. An optional knowledge base manager may address user problems.

The front end daemon may include an optional preferences manager that may define site-wide configuration defaults, and/or apply a desired object to the entire web site. An optional object manager may create or modify a definition of an object and/or an instance of the object. An optional code table manager may create one or more code tables, in the database, each having at least one entry. The code table manager may be used to create and/or delete an entry. The above-mentioned directory structure may include one or more code tables. An optional error report manager may report any error in intended user changes to a requested web page.

In an alternative embodiment, the instant invention may provide another web site management system. The web management system may include a database having a directory structure associating each web page of a web site with attributes thereof.

In one version of this alternative embodiment, the system includes a web server for displaying each web page, and a server-side front end daemon communicatable with the web server and the database. The front end daemon may identify the attributes of any user-changed web page and stores the attributes of any user-changed web page in the database. The identification and/or the storage may be automatic or user-initiated.

In another version of this alternative embodiment, the system includes a file system caching all web pages in a web site. The web pages so cached may be at least partially static. The back end daemon may parse the attributes to generate partially static web pages and store the generated partially static web pages in the file system.

The front end daemon, according to the alternative embodiment, may include a user manager for creating a hierarchy of group access and/or user access to the web pages and/or available editing options for the web pages. The user manager may be capable of assigning one or more access specifications to one or more web pages in a web site.

The front end daemon may include an asset manager for finding, uploading, and/or organizing one or more assets, each including a binary file. Each binary file may include a text file, a graphical image, a video image, a data file and/or an audio file. The asset manager is capable of browsing existing assets in the web site, creating a new asset, creating a new asset folder, and/or listing, via an asset panel. All files contain an optional user-specified asset.

The front end daemon may include a page manager for creating new web pages, modifying existing web pages with available web page attributes, and/or tying the web pages to web site architecture and navigation. The page manager may be capable of listing, via a page panel, every web page in hierarchical order or other arrangement. The page manager may provide a form for updating content of a selected, listed web page, adding a new web page, viewing the selected, listed web page, deleting the selected, listed web page, and/or cloning the selected, listed web page.

The front end daemon may include a sub-directory navigation manager for displaying the web pages in one of a collapsible, indented, and tabular directory. The sub-directory navigation manager may be capable of creating a new sub-directory navigation template, and/or modifying an existing sub-directory navigation template. The sub-directory navigation manager may also be capable of switching between a previous sub-directory and a successive sub-directory navigation template, if more than one sub-directory navigation template exists. By the switch, all web pages having the previous sub-directory navigation template will have the successive sub-directory navigation template, and all web pages in a selected hierarchy and having the previous sub-directory navigation template will have the successive sub-directory navigation template.

The front end daemon may include an optional forum manager. The forum manager may create, attach and/or manage one or more interactive posting environments. The front end daemon may include an optional help manager.

The front end daemon may include an optional object manager for creating and/or modifying a definition of an object and/or an instance of the object. The object may include a global object applicable to an entire server, network and/or web site, a page-specific object applicable to a user-specified page, graphic and/or web page and a widget being user-designed and applicable to the entire site, network or web site and/or the user-specified page depending upon user determination.

The front end daemon may include an optional utilities manager. The utilities manager may include one or more management utilities. The web site management utility or utilities may include one or more of the following features. An optional calendar may be used to coordinate work and availability among a network, site and/or web site management team. An optional clone utility may clone a web page, a plurality of web pages, or an entire web site. An optional color calculator may aid a user in selecting a background color or a text color. An optional info utility may track version numbers of a web site configuration. An optional multiple edits command may transfer a single web page, more than one web page, or the entire web site into a text file downloadable to a word processor. An optional regenerate utility may regenerate the static web pages in the file system by user-initiation. An optional regenerate navigation utility may regenerate the directory structure of the web site. An optional upgrade administrative directory utility, periodically or aperiodically, upgrades existing managers or introduces new managers.

The front end daemon may include an optional knowledge base manager for addressing user problems. The knowledge base manager may include a listing of past user problems and solutions therefor, and/or a user-entry for posting a new problem.

The front end daemon may include an optional preferences manager for defining site-wide configuration defaults, and/or applying a desired object to the entire web site. The front end daemon may include an optional code table manager for creating one or more code tables, in said database, having at least one entry. The code table manager may create and/or define an entry. The above-mentioned directory structure may include one or more code tables. The front end daemon may also include an optional error report manager for reporting any error in intended user changes to a requested web page.

In another embodiment according to the instant invention, a method of managing a web site is provided The method may include the following sequential, non-sequential, or independent steps. All web pages in a web site caching in a file system. The cached web pages may be at least partially static. At least one web page of the cached web pages is read by a web server. The read web page by the web server via a web browser.

The inventive method may further include the following steps. Attributes of each web page may be identified. The attributes may be stored in a database having a directory structure associating each web page with the attributes thereof. The caching step may include parsing the identified attributes for each web page from the database.

The inventive method further include the following steps. Whether a user has requested attributes form may be determined. The attributes form, if requested, for editing the web page attributes may be submitted to the user. Whether the user has edited any attributes may be determined. Whether the user is authorized to change the attributes sought to be edited prior to said identifying step may be determined.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

It is another feature and advantage of the instant invention to provide a management system. The management system includes a file system storing static portions of substantially all data pages in a data site. The system also includes a server communicatably connected to the file system. The server retrieves the static portions of one or more data pages stored by the file system and transmits to a site user the static portions of one or more data pages.

Optionally, the management system further includes a data page generator generating the static portions of substantially all data pages based on the data site for storage in the file system. The management system further includes a dynamic data transmit device to transmit dynamic data to be cooperatively presented with the static portions as the at least one data page to the site user. Optionally, the data page generator generates the static portions of the substantially all data pages and provides corresponding indexes therewith. Optionally, the server transmits the static portions to the site user responsive to the corresponding index associated with the at least one data page.

It is another feature and advantage of the instant invention to provide a method of managing a data site having the following sequential, non-sequential, or independent steps. Static portions of substantially all data pages in a data site, are stored using a file system. The static portions of at least one data page stored by the file system, are retrieved using a server communicatably connected to the file system. The static portions of the at least one data page, are transmitted to a site user using the server.

Optionally, the static portions of the substantially all data pages based on the data site for storage in the file system, are generated using a data page generator. Optionally, dynamic data to be cooperatively presented with the static portions as the at least one data page to the site user, are transmitted using a dynamic data transmit device. Optionally, the data page generator generates the static portions of the substantially all data pages and provides corresponding indexes therewith. Optionally, the server transmits the static portions to the site user responsive to the corresponding index associated with the at least one data page.

Notations and Nomenclature

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

BRIEF DESCRIPTION OF THE DRAWINGS

FIG. 14 is a screen display of a sample basic template grid;

FIG. 16 is a screen display of a Template information form;

FIG. 18 is a screen display of an Add a Page form;

FIG. 19 is a screen display of an Update a Page form;

FIG. 26 is a screen display of a user or group access form.

DETAILED DESCRIPTION OF THE INVENTION

Figure 1:
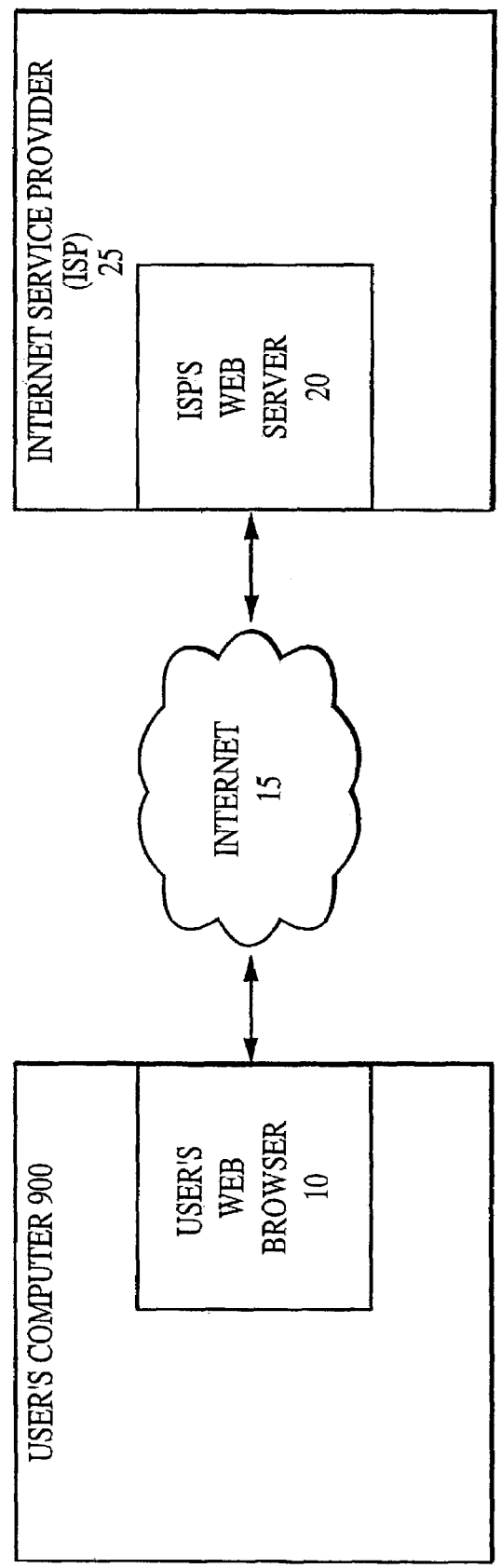
FIG. 1 is a general schematic of an embodiment of the instant invention and its environment.

At a certain point, managing a large-scale loal site, internal or external web site or other network managed site, and its associated assets becomes "manually" and/or computer assisted impossible. Every small addition becomes a daunting task because of the need to update an ever-growing and ever-changing number of links and assets.

Many market participants try to solve this problem by using half-way solutions, like frames, or by using expensive set-ups to generate sites on the fly with a combination of powerful databases and servers. Others simply employ oversized production teams in the hope of controlling their growing pains.

The instant web management system shines in this very scenario and is adapted to manage the most complex. However, the instant invention offers a marked departure from the approach of any existing management package such as a web management package. Consequently, Applicants have found the best way to describe the instant product that has no counterparts is to tell people what it is not and then to compare it to other web management tools before discussing the actual invention.

To this end, the instant web management system is not an HTML editor. Although editing HTML with the present invention is still possible using the standard content input window, the management system 30 is really meant to take over where the user's HTML editor leaves off. After the user has created the page contents or template layouts in the HTML editor of the user's choice, the user need only, for example, copy and paste the results into the instant management system.

The instant web management system is not an HTML editor with a server plug-in. Some HTML editors, e.g., Microsoft FrontPage, include a special plug-in installed on the server side that enables the user to see and rearrange the structure and order of files on the web server.

In contrast, the instant management system or web management system is a server application, not a server plug-in. It enables the user to parse, edit and rearrange the contents and pages and folders. This difference translates into the real ability to manage contents versus just arbitrarily stacking or rearranging containers of contents.

The instant management system is not a scripting language. There are scripting languages that allow the user to "talk" to the server and manipulate file contents and server functions; some come with a library of functions that can be applied to specific configurations. Usually, these require advanced programming knowledge.

In contrast, the instant management system allows the user "not to be an engineer." The user can use and create many functions without hacking or writing any specific code. If the user's server supports scripting, however, the user can embed scripting in the web management system and it will perform in a transparent manner (as if the web management system-did not exist).

The instant web management system is not middleware. Generally, middleware is used to facilitate generating web contents "on the fly." Traditional middleware accepts incoming requests from the server, prepares pages from data stored in the database, and then produces and delivers ready-to-serve pages to the server. That is, conventional middleware is analogous to a waiter in a busy restaurant who takes an order from a customer and returns with a ready meal.

In contrast, although the instant web management system processes data from a database and makes it server-ready, the similarities end there. Unlike conventional middleware, the instant invention does not take orders from the server. Rather, it creates a full set of static pages, text, graphics, content and the like, from the database and makes them available for the server in a transparent way. Rather than generating them "on the fly," the present web management system prepares all of the pages in advance and has them ready before a request comes in.

Using the restaurant analogy again, the web management system prepares a buffet containing the entire menu. So, although there was a waiter who set up the buffet, he works in the background and is substantially invisible to both the kitchen and the patrons once the buffet is ready to receive the patrons.

For all practical purposes, the instant web management system is not conventional middleware. It achieves somewhat similar outcome, but at a much lower expense and effort. Being transparent allows it to reside on, for example, an ISP's server, or operatively connected thereto, and be used by multiple users.

The instant web management system is not a cookie-cutter site "wizard." There are sites on the web that facilitate the creation of single-layer web sites using a simple wizard. These wizards are usually intended for small commercial operations. Comparing these wizards with the web management system is akin to comparing a nail-clipper and a chain-saw. Both tools cut; but any reasonable woodsman would use a chainsaw, not a nail-clipper, to fell a tree.

The instant web management system can easily create single-layer web sites. Templates may optionally be provided for very small sites as a starting point, offering a built-in capability for rapid expansion. However, the instant invention was designed to manage larger sites, networks, data, page colletions, etc., where frequent and diverse data additions are required.

The instant web management system is not like current web publishing tools, such as, StoryServer, Dynabase, etc. These are publishing systems that include proprietary client-side applications and require the use of their own servers. They typically carry a price tag of $50,000 to $100,000 (without hardware).

In contrast, the instant web management system performs essentially the same task in a very different way at a fraction of the cost. There is no proprietary client-side software to install and master. Instead, the user interface with the present invention communicates with the user's browser and economical database and server set-ups.

General System Components and Environment

For clarity, it may be useful at the outset to define certain terms used herein. An internet includes a computer network, wherein a user at one computer can, with permission from another computer, get information residing on the other computer. For example, the computer network optionally includes interconnected servers, each server serving one or more computers or computer networks. These interconnected servers facilitate the creation of a network of computer networks, the basis of the most famous internet, the Internet.

The World Wide Web (WWW or Web) includes some or all of the resources and users on an internet, namely, the Internet, using a standard linking protocol for transferring files, such as Hypertext Transport Protocol (HTTP). Accessing the Web is known as web surfing and is performed using a user interface, such as, a browser.

The term "web site" is generally intended to include the concept of a "web presence," namely, a related collection of linked files, which is non-geographically limited. That is, a term includes those files collection spread over more than one server in more than one geographical location, for example, in different buildings, in different cities, or even different countries. The web site includes an initial file, often called a "home page." The web site optionally is connected to a computer network, such as, the Internet. A "page" generally includes any linked file in an internet. A "web page" includes a file at a web site notated with a standard scripting language, such as Hypertext Markup Language (HTML), and having a web address, such as a universal resource locator (URL). The file optionally is a graphical file, text file, content file, etc.

In an embodiment of the instant invention, as shown, by way of illustration, in FIG. 1, a user's standard computer 900 may include a standard user interface 10 for browsing test and/or graphical files on-line. The user interface 10 may include, for example, a standard web browser. The user's computer 900 may be operatively connected to a standard computer network 15. The computer network 15 may include an intranet and/or an internet, i.e., any set of networks interconnected by devices, such as routers, that forward messages or fragments of messages between networks or intranets. Naturally, the Internet is one of the largest examples of an internet. It is to be understood that any references made hereafter to the Internet 15 are for convenience and are not intended to limit the scope of the invention. The Internet 15, in turn, according to the instant invention may be connected to a standard web server 20 at a standard Internet service provider (ISP) 25. The web server 20 may, for example, be running on an operating system. Illustrative operating systems include Microsoft Windows NT 4.0, Unix, and variants of Unix, such as, Linux, FreeBSD, AIX, HPUX, SGI and Solaris. The web server comprises, for example, standard scripting software, such as, Apache software for on-line scripting and Netscape software for Cold Fusion server-side scripting.

Figure 2:
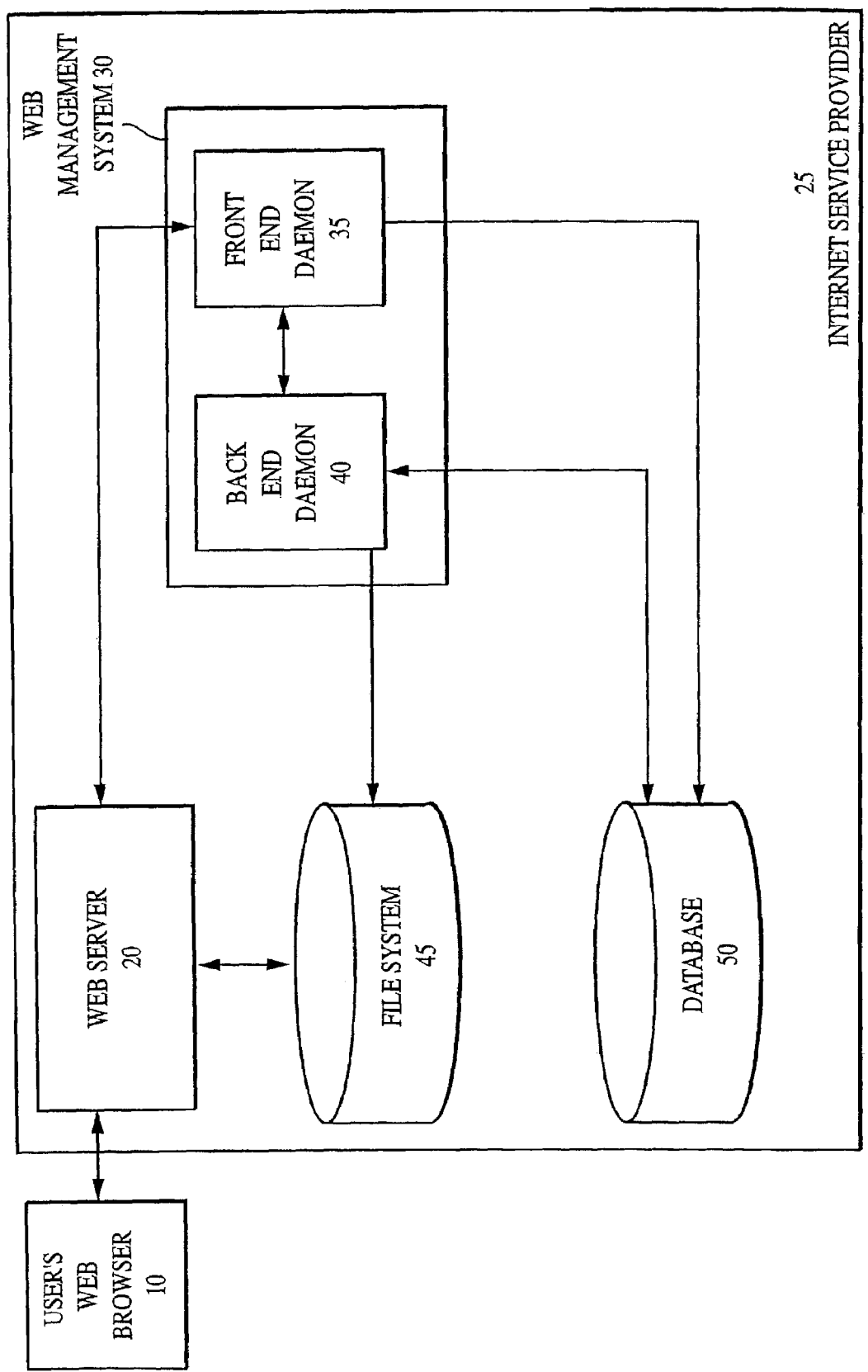
FIG. 2 is a more detailed schematic of an embodiment of the instant invention and its environment.

As illustrated in FIG. 2, the ISP 25 includes the instant web management system 30 in communication with inter alia the web server. Because of this configuration, the web management system 30 may be characterized as being "server-side," in contrast to being user-side, for example. The web management system 30 may include a front end daemon or script 35 and a back end daemon or script 40, which may communicate with each other. The front end daemon 35 may communicate with the web server 20.

The server-side location of the web management system 30 effects a significant reduction in "lag time." Lag time is the extra time taken to communicate with the server and the web management system 30 and to respond or to confirm the user's command. The lag time may depend on the quality of the user's Internet access and the amount of work the user are sending to the server to be processed.

Lag may be inevitable whether the user works locally or on-line. However, an advantage to working on-line with the server-side web management system 30 is that "what you see is what you (really) get." Besides, in a web site development effort, teamwork is virtually impossible when each member must wait for the other to finish before he can contribute his work. Working on-line in real-time using the instant invention allows all web site development team members to be kept "in the loop."

The web management system 30 may optionally operate with, for example, Netscape Navigator and/or Microsoft Internet Explorer pull-down menus, related links, and/or object navigation.

The ISP 25 also may include a standard file system 45 communicatable with the web server 20, and a standard database 50. The file system may include, for example, any readable/writeable storage device, such as, a standard hard drive. The front end daemon 35 may communicate with the database 50. The back end daemon 40 may communicate with the file system 45 and the database 50.

The database 50 may include a single database or two or more operatively linked or independent databases. The database 50 may include a standard relational database or an object-oriented database. For example, the database 50 may be supported by the Open Database Connectivity (ODBC) standard for accessing a database. Using ODBC statements in a program, a user may, for example, access files in a number of different databases, including Access, dBase, Excel, and Text. Alternatively, the database 50 may be supported by the Database Independent Interface (DBI) standard. The database 50 may alternatively be supported natively in a database system, such as produced by Oracle, MySQL, MS SQL, Sybase, Solid, Informix, Postgres, and Adabas, for example.

By way of example, the web management system 30 may maintain all of the different components, attributes, or meta-data of a web page in the database 50, at an ISP 25. For example, the web management system 30 is a comprehensive server-side web management system. It may maintain meta-data about every page and object in the system to generate and manage the web site optimally. It may also manage all assets, such as, pictures, marketing material, PDF file formats and/or internal resources.

But, instead of generating the page on demand, it may pre-generate the web pages and cache, at least partially, them as static pages. This pre-generation is performed by parsing, a process in which the web management system scans the site's database 50 for scripts, executes the commands the scripts contain, and generates the HTML pages. The result of this operation is a complete new set of fresh, at least partially, static pages. It follows that panels and pages that remain open may not reflect the changed server data unless the user reloads or refreshes them after the user has made changes thereto. Alternatively, the reloading and refreshing is performed automatically by the web management system 30.

The web management system 30 allows the user to reposition pages and entire directories swiftly and powerfully, for example, in a single command. The present invention may also enable the user to use up to a virtually unlimited number of templates without straining the database 50, since it does not have to generate them on the fly. As a matter of fact, with the present invention the user may be able to serve the user's site, even if the user's database software is down, because the web pages may be cached prior to requests therefor. In essence, the instant web management system 30 puts the abilities that were once limited to those versed in scripting languages into the hands of everyone on the user's web team. At the same time, the user may have full and flexible control, for example, to assign access and/or make corrections through a revision control feature that allows, for example, more than 20 "undo's" per page.

As mentioned above, one of the features that sets the web management system 30 apart from most desktop applications that reside on the user's computer's hard drive is that it is a server-side application. This means that the program resides on a remote computer, or server, and is utilized via the user's internet browser. Moreover, there is no need to install or configure any software with the web management system 30.

The advantages of using the instant server-side web management tool are substantial. By working on the web server 20, for example, the user may work on the actual web site in real time and can view the results with the click of a button. The web management system 30 may allow the different departments of the user's web development team to work simultaneously, building and updating the site as they go. Everyone in a web site development team may see the work in progress and add their input in a fluid manner. Writers, designers, programmers, editors, engineers and managers need not wait for the other parties involved in the site to finish their work before jumping into the mix. A user may find that this arrangement allows the user to streamline the entire production process in ways never before imagined.

General Method of Operation

Figure 3:
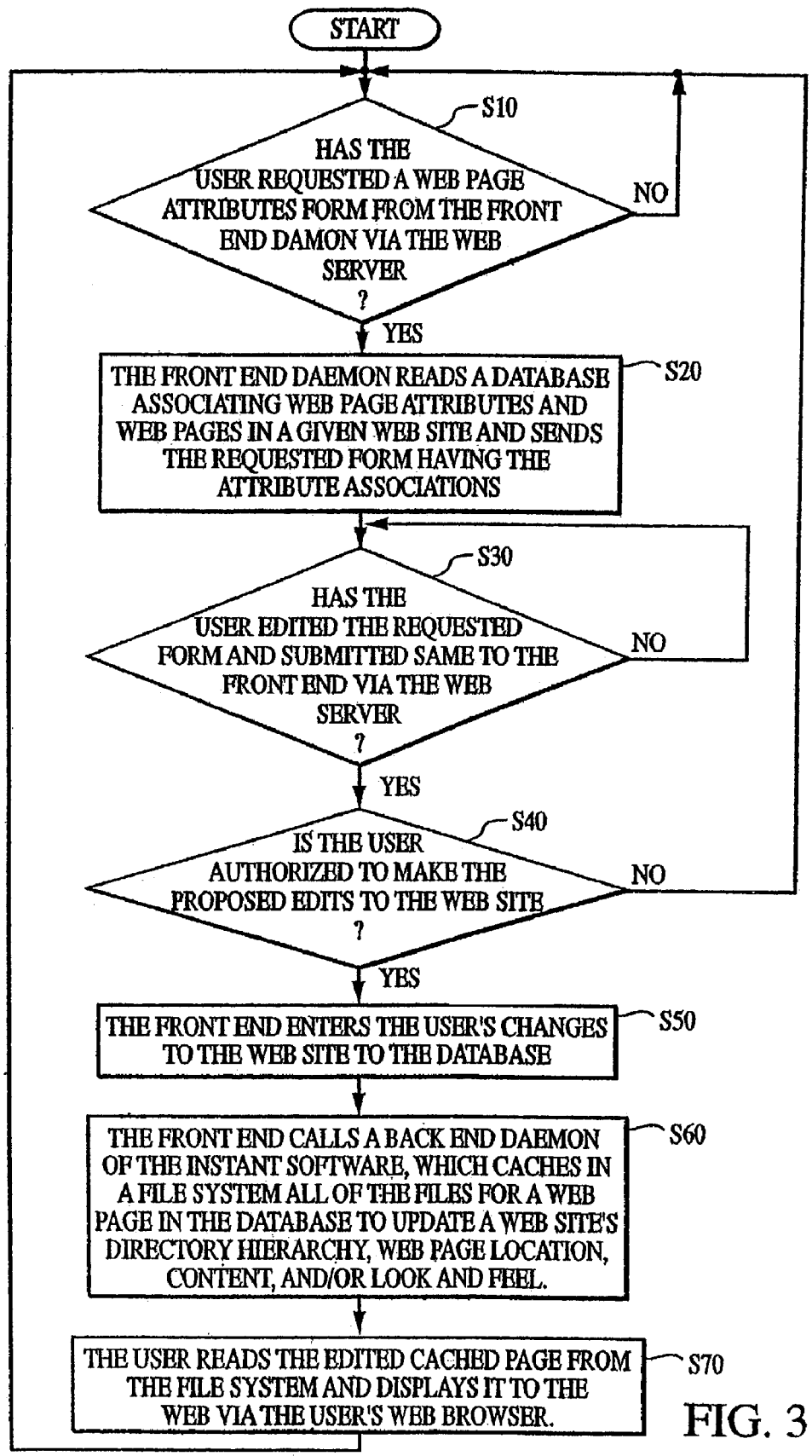
FIG. 3 is a flow chart illustrative of an embodiment of a method of operation according to the instant invention.

In view of above, an illustrative, general method of operation of the instant web management system 30 may be shown, by way of example, in FIG. 3, and as described hereinbelow. In Step S10, whether the user has requested a web page attributes form from the front end daemon 35 via the web server 20 is determined. If not, Step S10 may be repeated. In Step S20, the front end daemon 35 reads the database 50 associating web page attributes and web pages in a given web site and sends the requested form having the attribute associations to the user via the web server 20 and the user's web browser 10. In Step S30, whether the user has edited the requested form and submitted same to the front end daemon 35 via the web server 20 is determined. If not, Step S30 may be repeated. In Step S40, whether the user is authorized to make the proposed edits. If not, Step S10, for example, may be performed. In Step S50, the front end daemon 35 enters the user's changes to the web site to the database 50. In Step S60, the front end daemon 35 calls the back end daemon 40 to parse the edited web page or all of the web pages in the web site and cache same in the file system 45. In Step S70, the user, via the web server 10, reads the edited, cached web page from the file system 45. Step S10, for example, is then performed.

Figure 4:
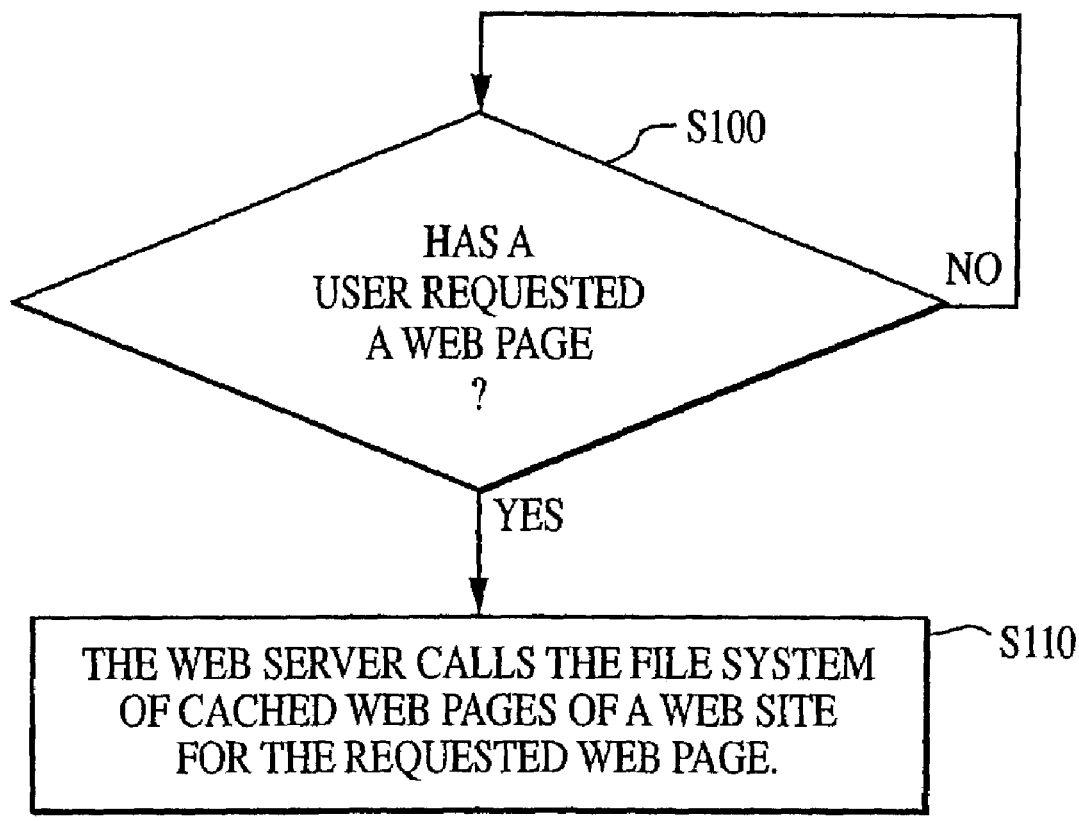
FIG. 4 is a flow chart illustrative of an embodiment of a method of use.

Note that a web surfer visiting a web site, created or managed by the instant web management system 30, may not even be aware of the use of the web management system. That is, as shown, by way of example, in FIG. 4, a web surfer may interact with the web site as usual. For example, in Step S100, whether the user has requested a web page is determined. If so, in Step S110, the web server 20 calls the file system 45 for the requested, cached web page. Indeed, if difference is noticed by the web surfer, it may be an improved rate at which the web page is displayed. Plainly, any improved rate is at least partially or substantially attributable to the instant invention pre-generating all of the web pages in the visited web site and caching same in the file system.

For completeness, searches by standard search engines are unaffected by the instant invention. Because the web management system 30 caches the files in the file system 45, a user or web surfer may manipulate standard search engines and any standard tools already existing on the web server 20 to search the user's web site with little or no difference in performance. Optionally, the web management system 30 may include a search engine for searching the database 50.

Navigation Architecture and the Single Page

The web management system, for example, is based on the concept that once the user creates a hierarchy of web pages and/or directories, the user will be able to manage the site using a few simple and powerful commands, without being required to manually or individually, with the assistance of the computer, update links and paths again.

For example, along with specifying all attribute identifications or fields attached to a new web page, the user optionally indexes the page relative to others in the data site or web site. The attribute identifications or fields, for example, include a home page identification, a template identification, a web page name identification, and/or content information. These identifications or fields are optionally used by the database to store information about each web page logically. Advantageously, such indexing would facilitate development of conceptual tree structures comprising directories and subdirectories of varying hierarchies. For example, moving a sub-directory would then correspondingly move every page in the sub-directory and every page depending therefrom. Because each page optionally includes attribute identifications or fields, such page movement need not entail a user to recreate the moved page.

When creating a new web page, the user may relate a page, for example, to a "parent" or "offspring." By selecting a relationship, the relative place of the user's page in the web site is identified and is maintained, optionally automatically, as the site grows and changes. This way, when moving a directory page (a "parent"), all subdirectories thereof are moved along with it. Advantageously, there may be many additional attributes, functions, objects and/or special environments, for example, that can be attached to and related to a page.

Figure 5A:
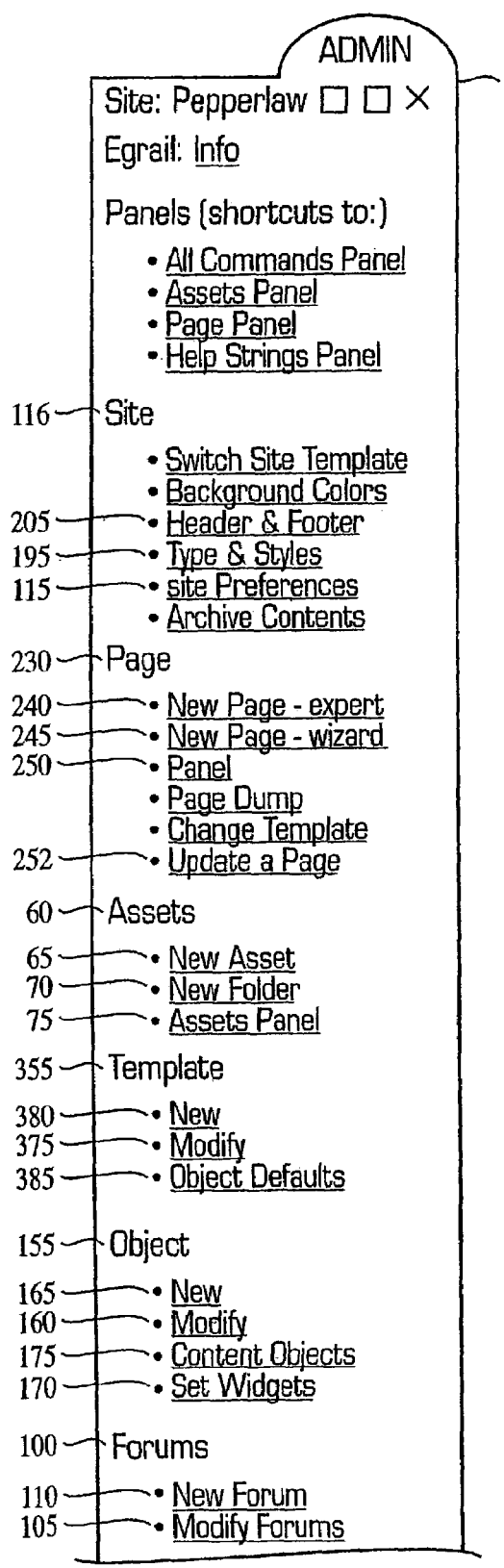
FIG. 5a is a first part of an embodiment of an administrative directory.
Figure 5B:
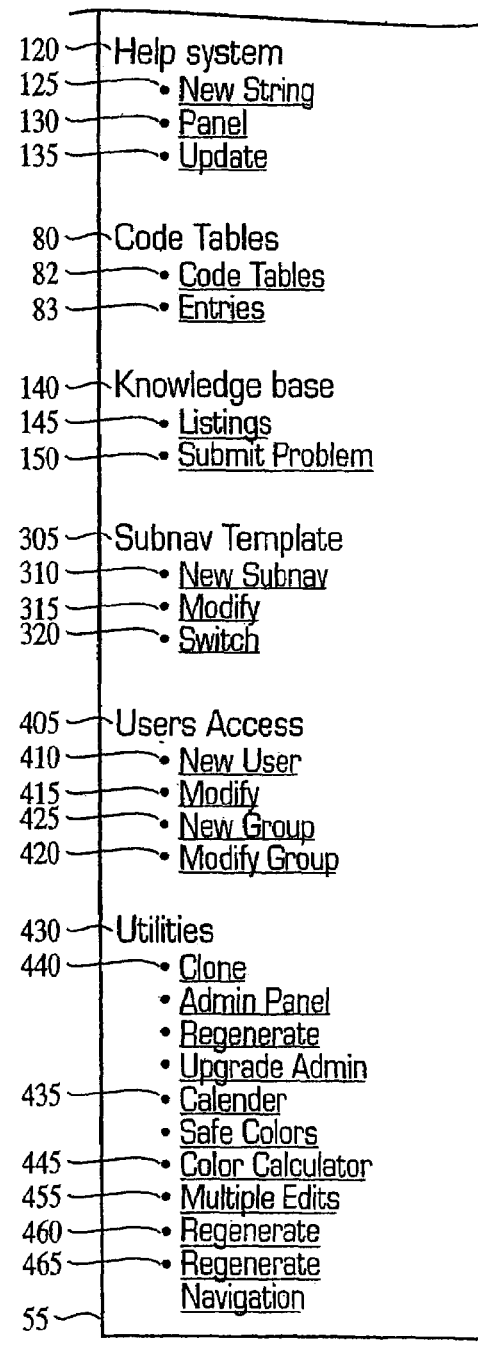
FIG. 5b is a second part of an embodiment of an administrative directory.

The web management system 30 may include an administration directory 55 as shown, by way of example, in FIGS. 5*a* and 5*b*. An alternative embodiment of the administration directory is shown, by way of example, in FIG. 6, and is designated by reference numeral 55'. The administration directory 55 may, for example, contain some or all of the commands or functions the user may need to use the instant invention. For convenience, unless otherwise specified, an underlined word or phrase in the figures may indicate a hot link, a hyperlink, or a short-cut to a respective web management form. Such hot links may be selected by a user in a conventional manner, such as by clicking on the hot link with a mouse. To this end, for convenience, the word "click" used herein, is intended to indicate, but is not limited to, a user request entry, for example, by depressing a mouse button. Following are brief descriptions of one or more functions or components that may be included in the administration directory 55, 55'.

Asset Management

An asset includes practically any type of binary file that, for example, contains its own description, such as graphical, files, text files, video images, and audio files. An optional Asset Management component, or Asset Manager 60, may, for example, allow the user to find, upload, and/or organize these files any way the user wants.

The Asset Manager 60 includes, for example, a New Asset form 65, a New Asset Folder form 70, and/or an Assets Panel form 75. The New Asset form 65 may be used to upload an asset through the user's browser. The New Asset Folder form 70 may be used to name and nest new folders. Creating folders to store assets gives the user the ability to organize them in accordance to the user's needs. The Assets Panel form 75, may, for example, list the files that contain the assets. Clicking on the folder may, for example, switch the view to see the actual assets. Clicking on an optional "Update" feature next to the folder name may, for example, facilitate only the modifications folder name and place, not its contents. The user may switch views between folders and/or apply management commands to individual assets, for example. Components of the Assets Panel form 75 may, for example, include any combination of the following components:

Size: In a conventional setting of commercial hosting with an Internet Service Provider (ISP) the web site owner is allocated a maximum disk space. The size feature may inform the user of the total amount of disk space and/or the available amount of disk space remaining.

Find: The Find feature may enable the user to search for an asset by name and/or any part of name.

Site: The Site feature may enable the user to identify the site to which the Assets Panel form 75 belongs.

New Folder: The New Folder feature may enable the user to name and/or create a new asset folder.

Reload: The Reload feature may enable the user to reload the Panel to include the latest list of folders. For example, after the user has added or edited a folder, the user may "click" on reload to refresh the Assets Panel form 75.

Optionally, below the header for the Assets Panel form 75 may be an indented list of all the assets folders. Optionally, the folders in the list may be connected with lines that represent their nesting relations.

Clicking on an individual folder name may, for example, switch this panel to a view of the number of items contained and/or the contents. To switch back, the user may, for example, click on an optional "switch" link at the top of the Assets Panel form 75.

Update: The Update feature may enable the user to change the folder name and/or place it in the list hierarchy.

Delete: The Delete feature may enable the user to delete the folder.

A common usage of the assets is to upload and connect graphic images to the site contents.

To use an image in the web management system 30, a user may, for example, follow these steps:

a) Click on "New Asset";

b) Select the image to be uploaded from the user's desktop, give it a name, and place it in a folder of your choice; and c) Place the asset anywhere in the HTML with a tag that, for example, may include: Image(your_image_name).

Advantageously, an asset, which in the above example is available to everyone on the user's web management team at all times. Optionally, the instant web management system may calculate the image size and tag it accordingly. When the user updates an asset with a new image, even one with a different name and size, the instant invention may automatically recalculate and update each and every occurrence of that asset in the user's site.

To replace an image in the site a user may, for example, follow these steps:

a) Find the image;

b) Click on an optional "update" feature and upload your new image; and c) Click on a "Regenerate" command to replace the old image with the new one.

Code Tables

A code table may include a two-column table that, for example, translates unique names in the first column into unique numbers in the second column. A computer may then use the numbers internally, instead of the names. In databases, code tables may, for example, be used to store many occurrences of a name to save space and to resolve update issues, e.g., how to change a name, if it is stored in several places. For example, the names may include those of assets, web pages, etc.

The web management system 30 may include an optional Code Table Manager 80 that may, for example, allow the user to create lists, or code tables, and then add or delete entries from those tables. These lists may then be attached or bound to an object to create a pull-down menu item containing all the entries in the list. For most simple everyday web management system tasks, using code tables may not be necessary.

Configuration

Configuration menus 85 control the basic appearance and behavior of the navigational tools. This feature, for example, includes a Clone form 90 and/or a Site Objects form 95. The Clone form 90 may be used for example to clone a web site and/or create an identical twin site. The Site objects form 95 may be used to apply an object, defined below, to a user's entire web site.

Forums

Forums, according to the instant invention, may include interactive posting environments that may be created, attached and/or detached effortlessly to any page of the user's site where discussion and interaction among readers is desirable.

Forums may also be attached to pages during site production for team coordination and/or may be managed through an optional Forum Administration component or Forums Manager 100. The Forums Manager 100 may include a Modify Forums form 105, and/or a New Forum form 110. The Modify Forums form 105 may, for example, enable the user to delete a forum no longer desired. The New Forum form 110 may be used to create a new forum. The user, for example, may name it and/or enter an optional administrator password. Optionally, a web site administrator may be able to remove messages from the forum.

When creating the forum, optionally, the user may need to enter a default forum password, for example, an alphanumeric string. After the forum is created, the user may change the forum password in an optional "Forum Password" or "Forum PW" window at a Site Preferences form 115.

Help Strings

An optional help window, which may be case-sensitive, accompanies some or every function in the web management system 30. Help messages or strings may include help links local to the web site. In the instant web management system 30, optionally every underlined command or field name may be linked to a pop-up help window that contains a short explanation about the field or command.

An optional Help Strings Manager 120 may contain one or more tools to manage these help strings. Such help strings, may, for example, "pop up" in a graphical window, when the user clicks on an underlined command or category in a web management system form. The Strings Manager may, for example, include a New String form 125, a String Panel form 130, and/or a Update form 135. Optionally, a help button in each individual page may be turned into a local help message. For example, by clicking on the "Help" button the first time, optionally, the user may create a new entry in the help strings.

The New String form 125 enables the user to create a new string. The user may name it and enter the contents of the message in the window. The contents may be written in HTML code or other suitable code. The String Panel form 130 may include a "pop-up" graphical window that contains a list of all the strings in a web site. The String Panel form 130 may be used to modify strings. The String Panel form 130 may also display string names and sizes and may provide direct access to their contents. After a user creates a new string, it appears in the String Panel form 130. The Update form 135 contains a list of all of the strings in the user's site. By clicking on the links to the strings, the user may access and/or modify their contents.

Knowledge Base

An optional knowledge base includes an advanced help and support system. Users submit a question as a "new article" and the question is then automatically distributed by e-mail to a number of support experts. The answer may be posted under the problem's description. The user who posted the problem may continue the e-mail discussion with a support expert until the problem is solved. The solution then becomes part of a collection of solved problems that any user can browse. An optional Knowledge Base manager 140 may, for example, include a Listings form 145 and/or a Submit Problem form 150. The Listings form 145 may contain a list of problems that have been posted by users with a summary of their solutions. The Submit Problem form 150 includes a graphical window for entering the description of the user's problem.

Objects

Objects, according to the instant invention, include the basic building elements of a form wizard, global/site objects, widgets, and/or page-specific objects. Objects include, for example, at least two parts: object definition (the "code") and the instance of that object (the "data"). An object definition tells the web management system 30 how to handle an object, what to store in it, and/or where to put it. An object instance is the data that makes up a copy of that object.

If, for example, a tree was an object, its definition would be that it is vertical and it has bark on the outside and roots below. Its instance would be the information that sets each tree apart from the rest, namely, its individual data. Examples of objects are new fields in a page, global items that appear throughout a site such as a footer, and advertisements.

Global objects may contain one value each, and may be applied to the site as a whole using, for example, the configuration menu under an optional Preferences form. Access to objects may be reserved for users at the webmaster level.

Page-specific objects may be entered using a New Object form, described below. Once created, these objects appear on an Add a Page form, described below, as input windows, for example. Objects may be placed wherever the user wants that object to show up in the template by using, for example, the following tag: wms_obj_name (name being the name the user gives the object).

Widgets allow the user to design an object that is page-specific. An optional yes/no selector may, for example, appear on every page update form to inquire whether to include this object in its entirety on that particular page.

An optional Objects Manager 155 may include a Modify Object form 160, a New Object form 165, a Set Widget form 170, and/or a Content Object form 175. The Modify Object form 160 may be used to change an object's definition. The New Object form 165 may be used to create, define, and/or name a new object. The Set Widget form 170 may be used to link the user to the widget contents input window, wherein the user may create an object and define it as a widget.

Figure 7:
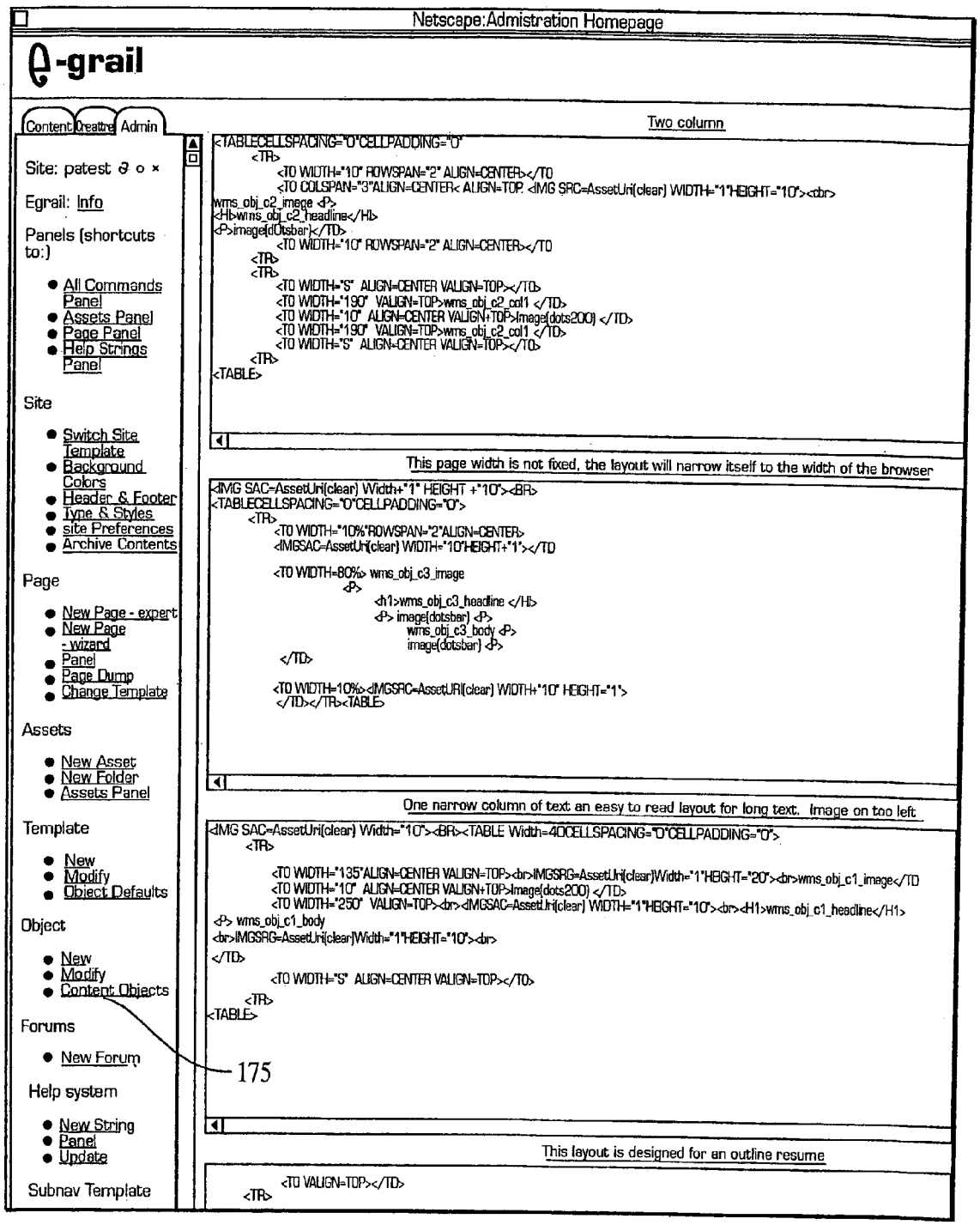
FIG. 7 is a screen display of sample content objects.

The Content Object form 175 may be used to determine the "look and feel" of a web page. Content therein may, for example, be entered through an interactive wizard. FIG. 7 shows, by way of example, source code for three sample content objects: a "Two column" format 180, a "This page width is not fixed" format 185, and a "One narrow column of text" format 190.

Figure 8:
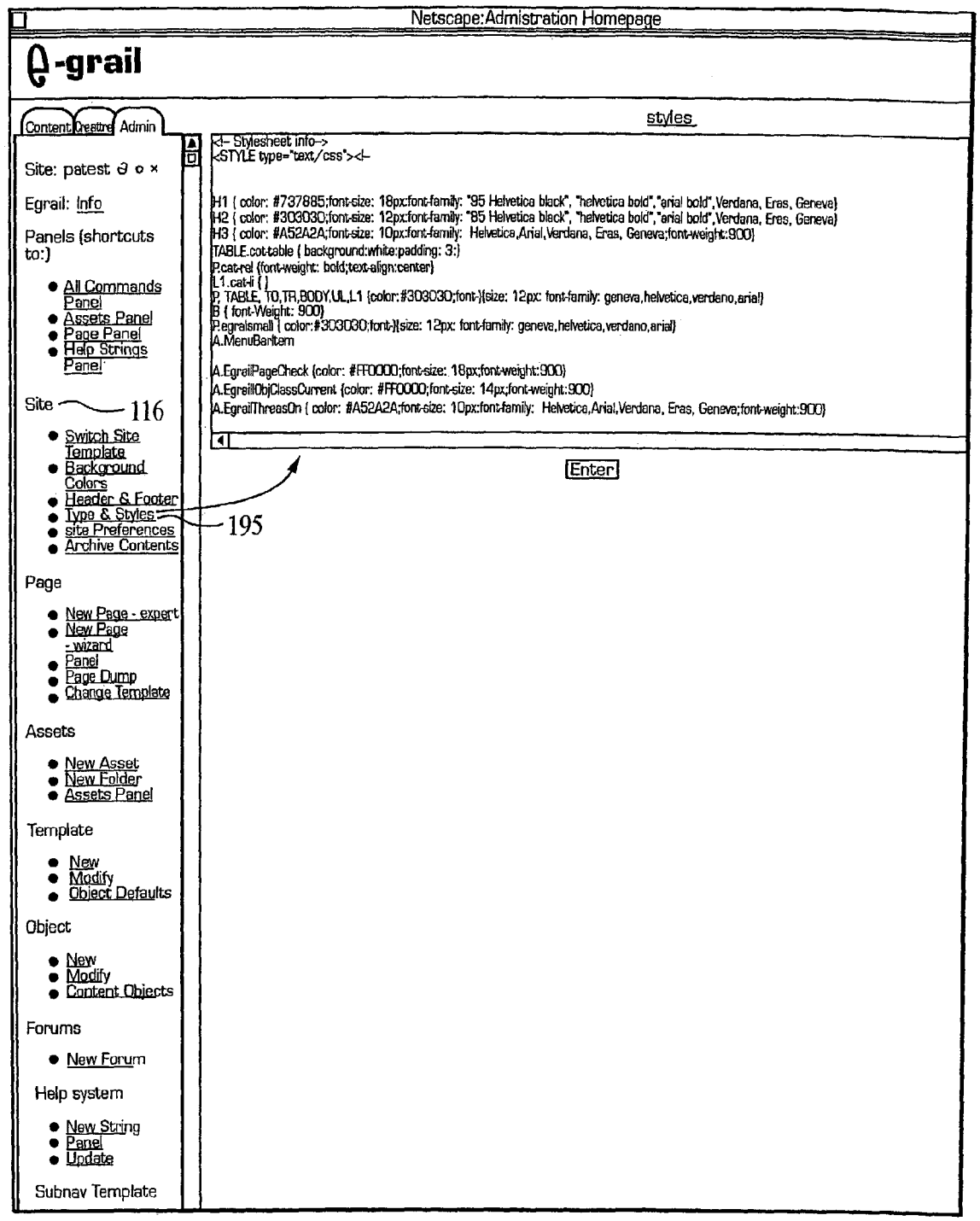
FIG. 8 is a screen display of a style object.

Optionally, a Type & Styles Object form 195, as shown, by way of example, in FIG. 8, may be used to create, modify, and/or delete style objects, such as sample style object 200. Such a style object form may contain style sheets applicable to an entire web site. A Style sheet is a definition of a document in terms of such elements as:
- the default typeface, size, and/or color of headings and body text,
- how front matter, e.g., preface, figure list, title page, should look,
- how all or individual sections should be laid out in terms of space, e.g., in two newspaper columns, in one column with headings having hanging heads, etc.,
- line spacing, margin widths on all sides, spacing between headings, for example,
- the number of heading levels that may be included in any automatically generated table of contents, and
- any boilerplate content to be included on certain pages, e.g., copyright statements.

Optionally, as necessary, specific elements or attributes of the overall style sheet may be overridden by explicit coding that applies to a given section of the web site. Optionally, the style sheets may include standard cascading style sheets (CSS), which anticipate other style sheets filling in or overriding an overall basic style sheet. In such an embodiment, these overriding style sheets may be linked to the overall basic style sheet.

Figure 9:
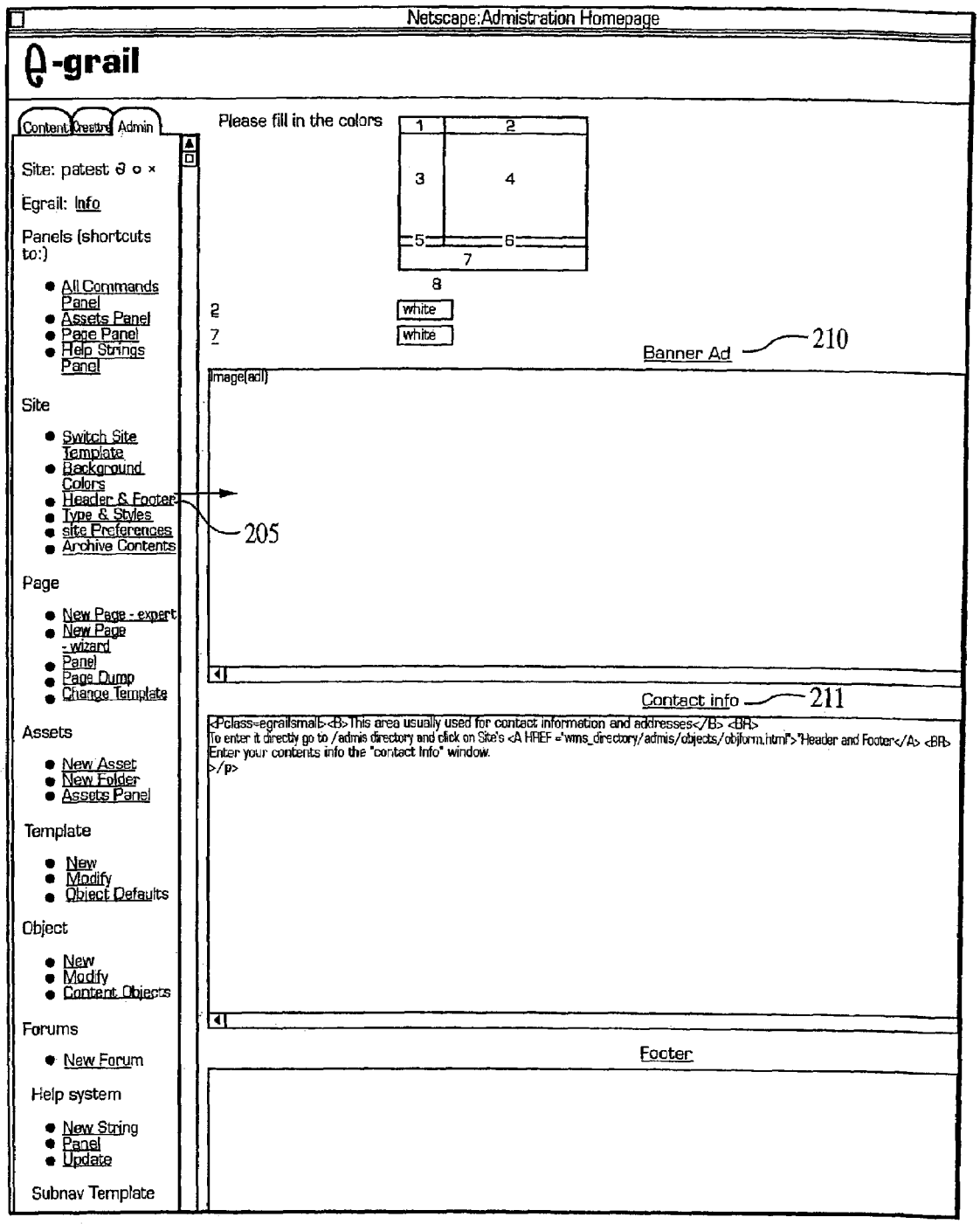
FIG. 9 is a screen display of header and footer objects.

Optionally, a Header & Footer Object form 205, for example, in the Object Manager 155 and/or in the Site Manager 116, as shown, by way of example, in FIG. 9, may be provided for creating, modifying, and/or deleting header and/or footer objects. Header and footer objects may, for example, enable a user to attach content to a header, a top portion of a web page and/or to a footer, a bottom portion of a web page. A header object may include, for example, a banner ad object 210. A footer object may include, for example, a contact information object 215.

Figure 10:
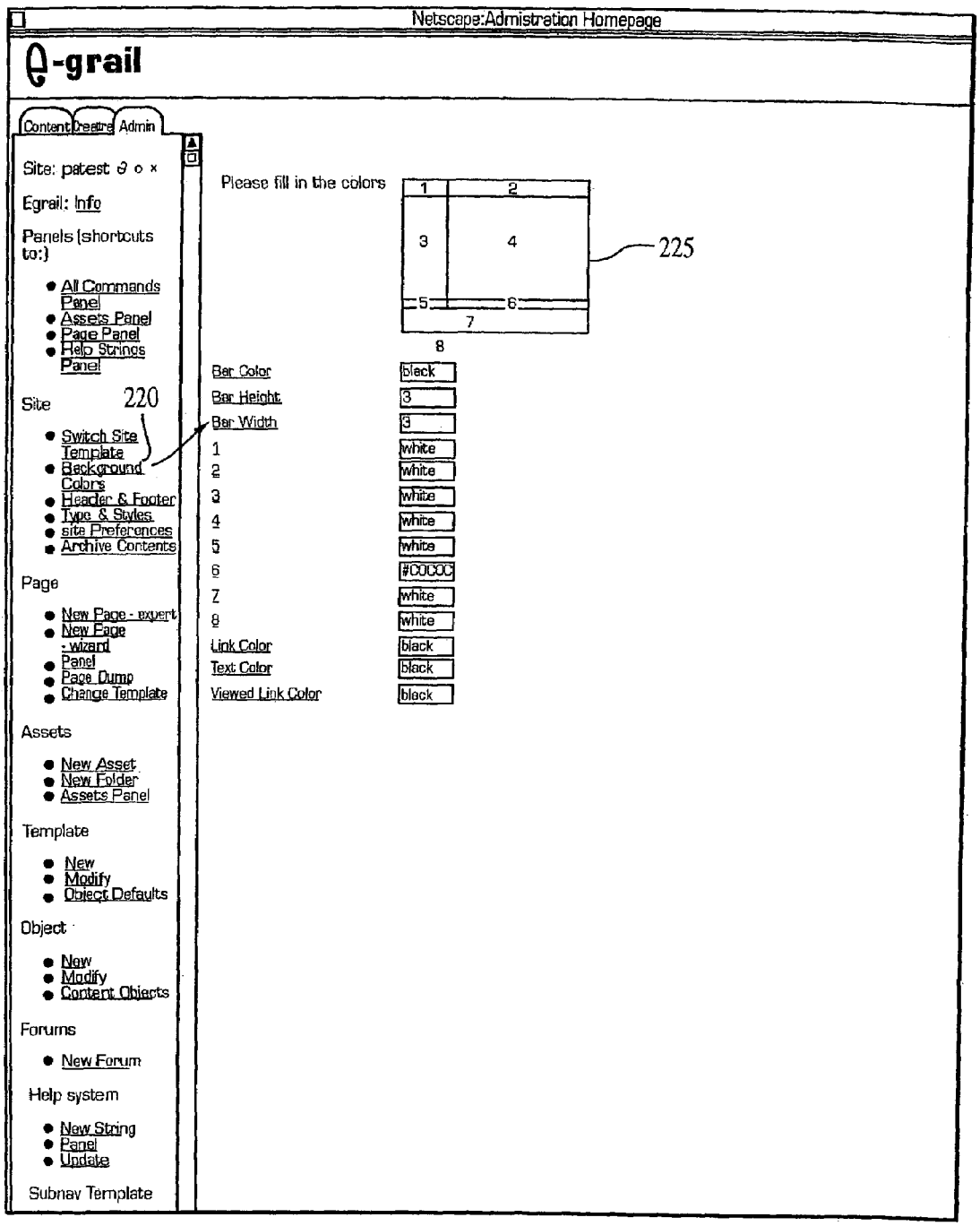
FIG. 10 is a screen display of a sample background colors object.
Figure 11:
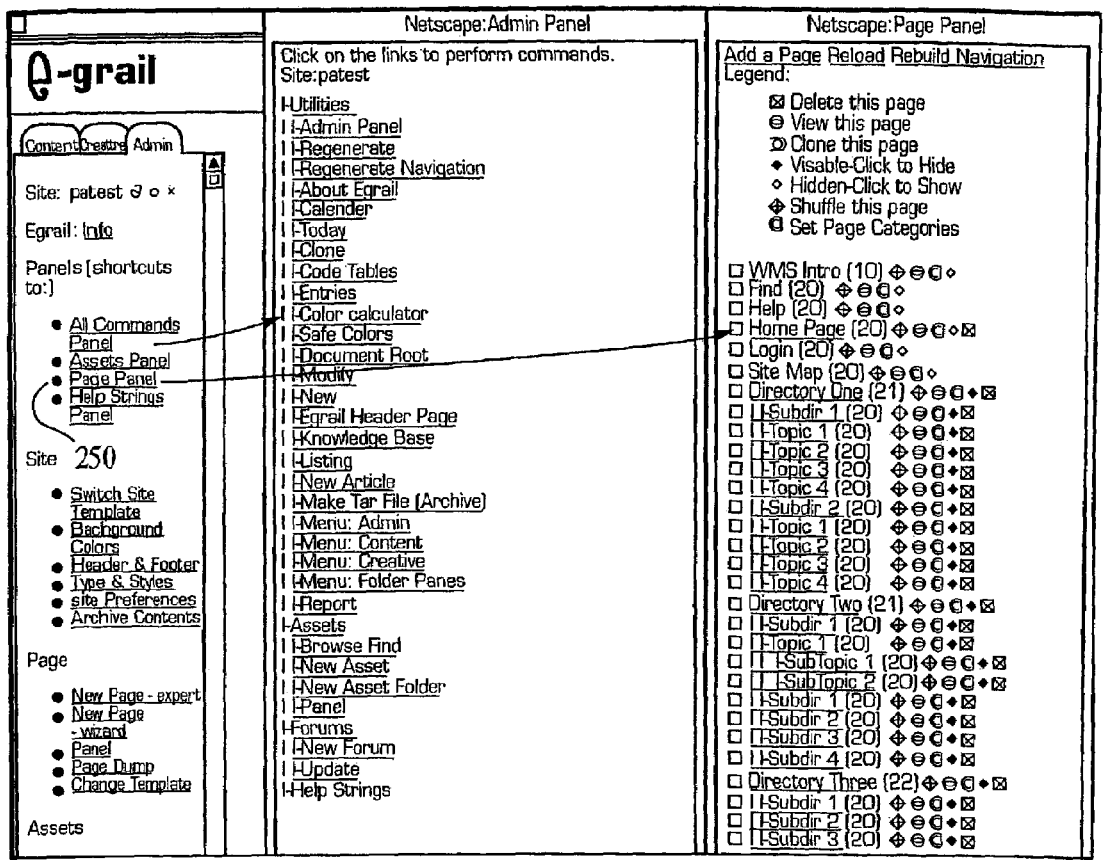
FIG. 11 is a screen display of sample panels.

Optionally, a Background Colors Object form 220, as shown, by way of example, in FIG. 10, may be included for enabling a user to control and/or "paint" different areas of a background template grid, such as, sample basic template grid 225.

Page

An optional Page Manager 230, shown, by way of example, in FIG. 5*a*, enables the user to create new pages and/or modify existing ones with some or all of the necessary attributes, and then tie them into site architecture and navigation. Optionally, the Page Manager 230 includes a revision control feature, which may be analogous to a standard "Undo" command. As a user modifies a web page's contents, the web management system 30 keeps track of, for example, up to, or more than, the last 20 revisions. With such a feature, advantageously, the user may return to any previous tracked version of the page at any time.

Figure 6:
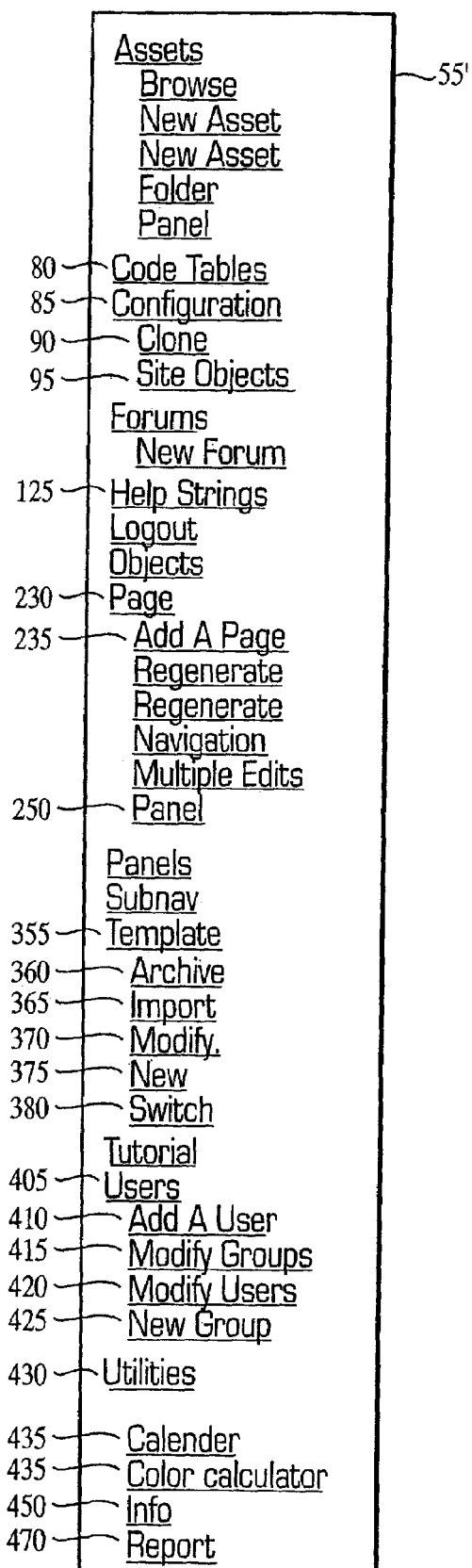
FIG. 6 is another embodiment of an administrative directory.

The Page Manager 230 may also, for example, include an Add a Page form 235, as shown, by way of example, in FIGS. 6 and 18. The Add a Page form 235 may, for example, allow a user to create a new content, page or web page and assign thereto all of its related properties. Alternatively, instead of the Add a Page form 235, the instant invention includes a New Page-Expert form 240 and/or a New Page-Wizard form 245, as shown, by way of example, in FIG. 5*a*. The New Page-Expert form may be used to create a new page and assign all its related properties. Unlike the Wizard form 245, the Expert form 240 may require use of HTML.

In contrast, the New Page-Wizard form 245 may enable a user without HTML skills to create pages. That is, a user may be prompted to name and position a new page, and then may be presented one or more pre-set or stored layouts, grids, or templates from which to choose. After a layout is selected, the user may input content as simple text and/or select images from the user's desktop.

Figure 12:
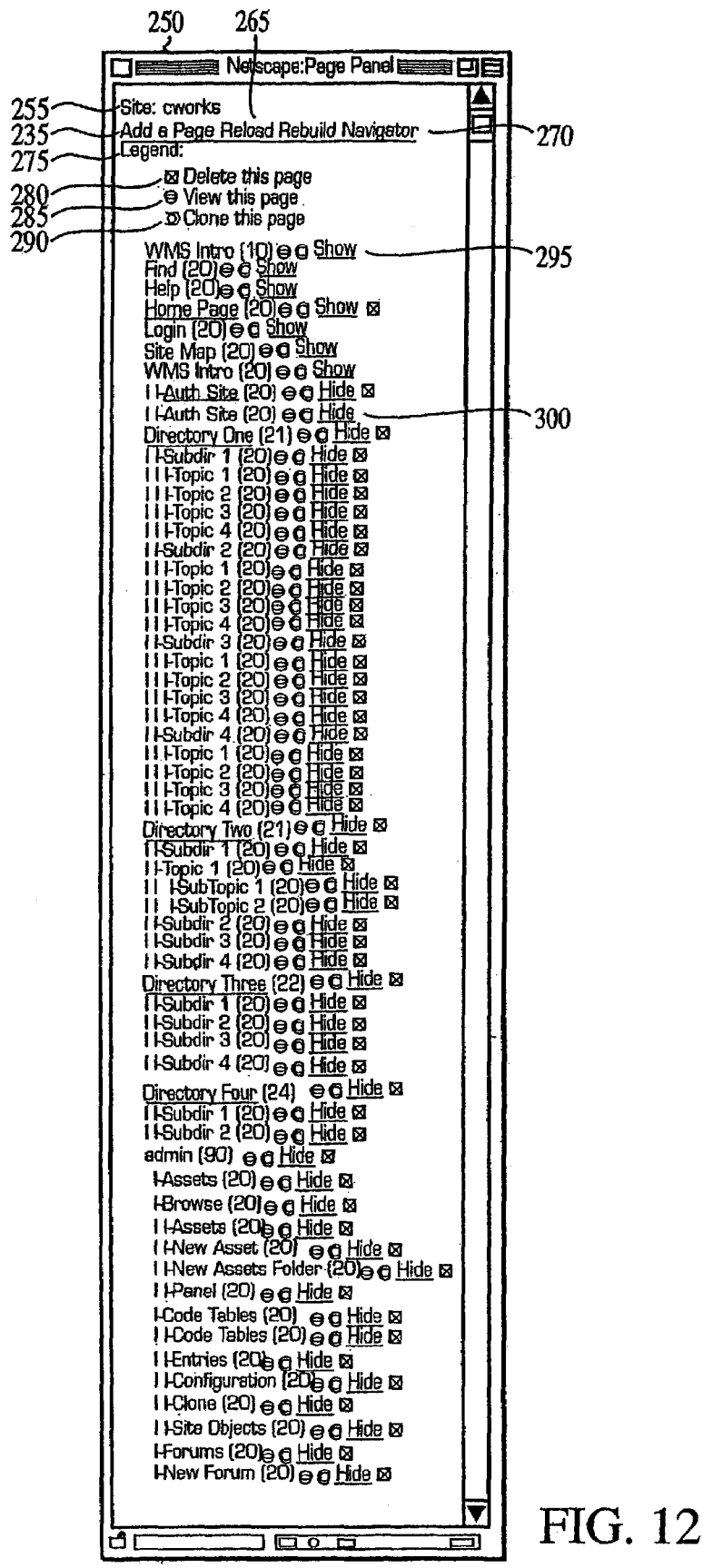
FIG. 12 is a screen display of a sample page panel.
Figure 19:
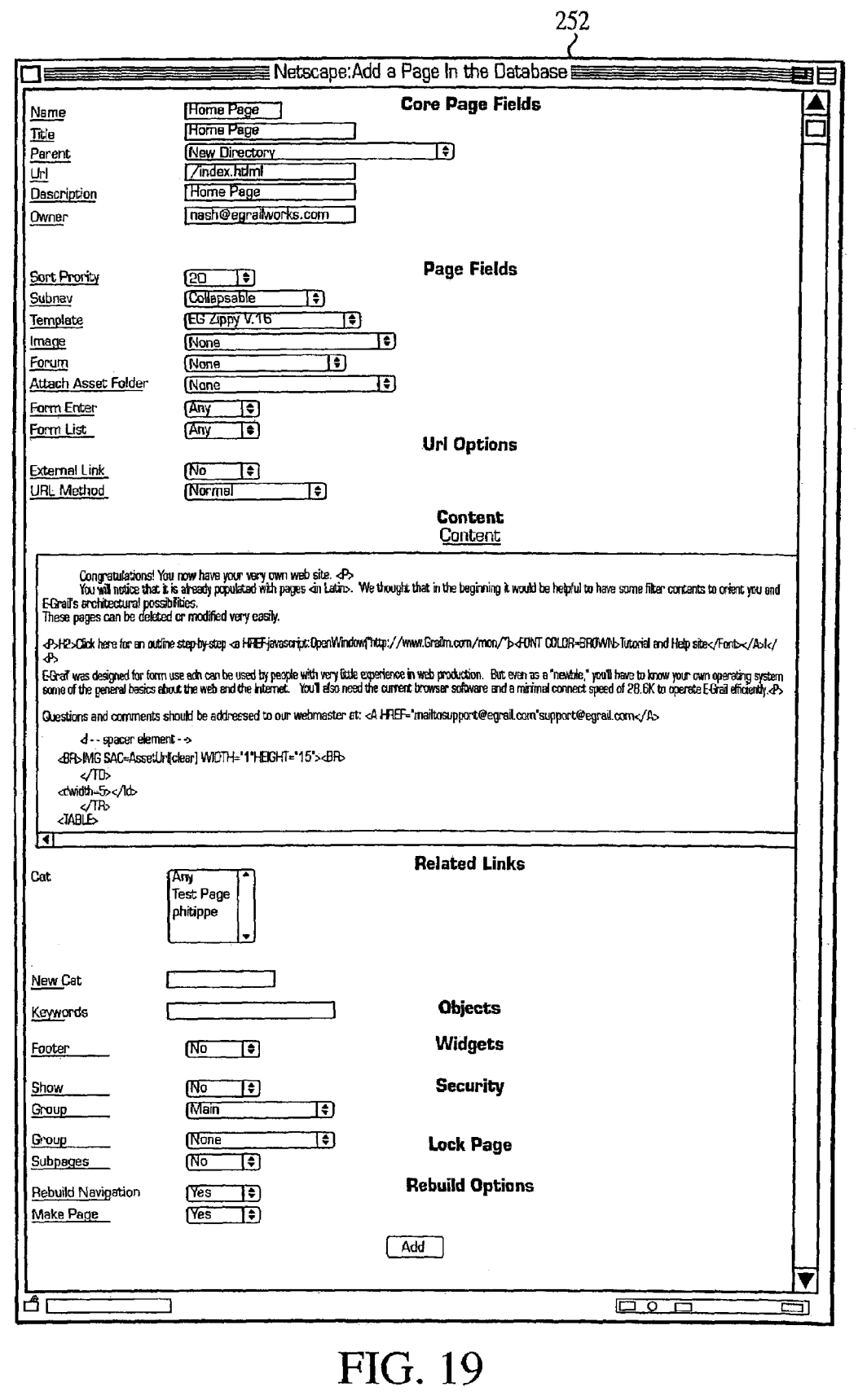

Optionally, the Page Manager 230 may include an optional Page Panel form 250, as shown, by way of example, in FIGS. 5*a*, 6, 11, and 12. For example, if a user clicks on the Page Panel form 250 hot link, a Page Panel form 250, as in FIGS. 11 and 12, may be provided to the user. Referring to FIG. 12, the Page Panel form 250 may include a collection of some or all of the available web management panels and/or web site directory structure. The same panels, optionally, may also be available from related subdirectories. The optional Page Panel form 250 is discussed further hereinbelow. An Optional Update a Page form 252, as shown, by way of example, in FIGS. 5*a* and 19, may, for example, be used to update an individual web page.

Panels

Panels, according to the instant invention, provide easy administrative access to some or all pages in a user's site or web site. Panels may include "pop-up" windows that provide a user with an overview of the site structure. They also may provide instant access to the roots of every page in the user's web site. Panels also let the user make use of a few simple web page management commands: Clone, Hide, Show, and/or Delete, for example.

The above-mentioned, optional Page Panel form 250 may list every page or substantially all pages in the user's site in hierarchical order, for example, as shown in FIG. 12. When the user selects a page from the Page Panel form 250, the user may access a form that allows the user to make changes and/or update the content of that particular page. The user may also view, delete, and/or clone a page using the Page Panel form 250. Optionally, the panel may remain conveniently located on the side of the user's monitor as a navigation tool.

The Page Panel 250 may, for example, include one or more of the following features.

Site feature 255: The Site feature may, for example, provide the user with the web site name.

Add a Page feature 235: The Add a Page feature 235, of course, links to the Add a Page form 235.

Reload feature 265: The Reload feature 265 may, for example, reload the Page Panel form 250 to reflect any new modification. The Page Panel form 250 may be just a reflection of the server and may not update itself. If this is the case, after the user has added or edited a page, the user may "click" on the Reload feature 265 to refresh the Page Panel form 250.

Rebuild Navigation feature 270: Rebuilding navigation from the database 50 may be necessary, when the user has altered items that affect the site hierarchy and navigation, for example, by using hide, show and/or delete a page commands.

Legend feature 275: The Legend feature 275, for example, explains the symbols pertaining to this panel.

Delete feature 280: The Delete feature 280 may, for example, be used to delete a page. The user may click on the "Rebuild Navigation" feature 270 to make the change effective throughout the site.

Check or View feature 285: The Check or View feature 285 may, for example, enable the user to view the actual page as if using a site map, i.e., not an "edit" view, but rather the normal page view.

Clone feature 290: The Clone feature 290 may, for example, be used to duplicate a page and to open it in an "Update a Page" window with a renamed URL.

Show or Visible feature 295 and Hide or Hidden feature 300: Clicking on the Hide feature 300 excludes a web page from the navigation system of the site. The hidden page may not appear in the directories, subdirectories and/or pull-down menus, although it may still be an integral part of the site. That is, the hidden page may be maintained in the architecture as a normal page, for example, to the extent that it can be linked and accessed, and that it can have visible siblings, which appear only when the hidden page is active. Once the user clicks on the Hide feature 300 again or by clicking on the Show feature 295, the tag and the web page itself will change to visible.

Page list feature: Optionally, below the header, for example, may be an indented list of all of the web site pages. Optionally, the pages in the list may be connected with lines that represent their relations. For example, the page "Assets" may be a sub-directory of "admin", and "Browse" may be a subdirectory of "Assets".

Priority Rank feature: Pages may be sorted alphabetically or numerically. To promote or demote a page in the same layer, the user may change its priority rank. For example, for a numerical ranking, number one may rank first, and number twenty may rank last. A default number may be the greatest possible number, for example, to allow easy promotion. The Priority Rank feature may be displayed, for example, for each directory and/or sub-directory, for example, set apart in parentheses. For example, the "Browse" sub-directory of "Assets" may have a "(20)," designating the "Browse" sub-directory as having a rank of twenty.

The instant invention may also include an optional String Panel and/or an Asset Panel to help administer strings and/or assets, respectively.

Preferences

An optional Preferences Manager may include setups that apply to the web site as a whole. These setups may include configurations and/or site objects.

The Preferences Manager may include a Configurations form or menus 85 and/or a Site Objects form 95. The Configuration form 85 may include one or more basic setups that apply to the site as a whole. Some of the fields optionally may be locked for safety reasons. A user, wanting to unlock them, may optionally contact the user's system administrator, for example. Other fields may allow the user to set defaults, and/or safety permissions that apply to the entire site.

Defaults may, for example, include either or both of the following:

A Default subnav feature may specify the desired type of sub-directory navigation. The user may choose "no subnav," "collapsible subnav," or "indented subnav," each described hereinbelow.

A safety mode (for example, set to "No") may be used to prevent a user from deleting directories with hierarchical offspring. A Calendar database feature may be used to select an existing utility calendar from another project, e.g., for team coordination. A Menu Depth feature may limit a number of levels in the pull-down menus. For example, the default may be two. Plainly a fewer or greater number of levels is possible. For example, the number of levels may be one, five, or ten. An optional Timeout feature may include a delay to retard the collapse of pull-down menus. The delay may be in predetermined units of time. For example, the delay value may be set in thousandths of a second, wherein a default value may be 1500 (one and a half seconds). Of course, a longer or shorter delay may also be acceptable.

The Site Object form 95 may be used to apply an object to the entire web site.

Sub-Directory Navigation Manager

An optional Sub-directory Navigation (Subnav) Manager 305, according to the instant invention, may display a listing called a subnav, of all, or substantially all of the pages in a directory, whether it is collapsible, indented, and/or tabular. It may even be, for example, a rotating advertisement on entry-level pages. Optionally, the Sub-directory Navigation Manager 305 allow the user to maintain, design, and/or re-use these special elements.

The sub-directory navigation manager 305 may, for example, include a New Subnav form 310, a Modify form 315, and/or a Switch form 320. The New Subnav form 310 may enable the user to use the subnav area for purposes besides navigation. As a "Home Page", the user may choose to place a promotional piece, for example. To do that, the user may create a design may corresponds in size to the subnav area and enter the HTML code in the New Subnav form. The Modify form 315 may enable a user to modify existing sub-directory navigation methods and/or architecture. The Switch Subnav form 320 may be used to switch among the collapsible, indented, and/or Subnav tabular web pages listing.

Template

Templates, according to the instant invention, may, for example, govern the "look and feel" of a page. A sample template may include an HTML "page" that contains a collection of standard, repetitive elements of a web site, such as, the sub-directory navigation thereof. Indeed, templates may control everything in a web page except contents. If an item to be accessed or changed is shared by most pages, it may advantageously be found in a template.

As technology changes, so will the types of acceptable template data formats. Currently, they are HTML, tomorrow they may be XML or VRML, wherein nothing in the web site need change than the template. Because a back-end script or daemon 40 generates static pages in advance, the user may use any number of templates throughout the site without slowing it down.

The sub-directory navigation system may also be embedded in the template, and the user may control some of its properties using a "Modify" feature or link.

The instant web management system 30 allows users to select from standard templates or optionally to customize available templates to maintain the individuality of the web site's look, feel and function through the use of objects, defined above, that may be unique to the web site. The objects may be written into a template in a transparent way. The user may create a template with relative ease and embed web management objects in them, as necessary.

An example of a layout of a template, such as the basic template grid 225, mentioned above, may be found in FIG. 14. Note that the alphanumeric characters in the template layout of FIG. 14 do not include reference numerals of the instant invention. Rather, the alphanumeric characters are provided to indicate a possible level of detail and flexibility available to a user desirous of customizing the template layout. Optionally, such templates may be customized or modified by applying standard HTML techniques or standard drag-and-drop techniques to a template layout to change the look or grid structure of the template "real estate."

Figure 13:
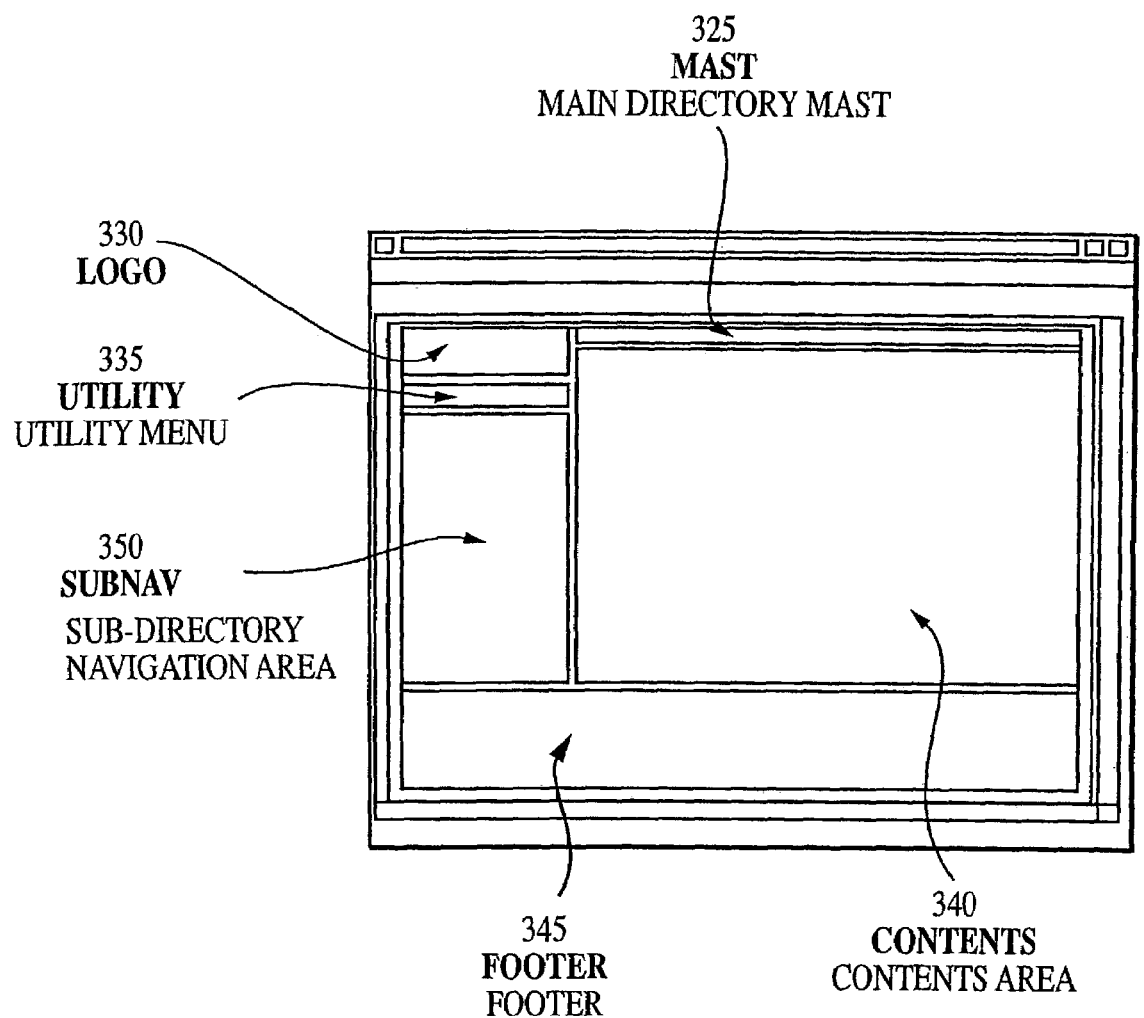
FIG. 13 is a screen display of a sample template real estate.

A sample template, as shown, by way of example, in FIG. 13, may advantageously be user-defineable or pre-set. "Real estate" terminology therefor may, for example, include a Mast area 325, a Logo area 330, a Utility area 335, a Contents area 340, a Footer area 345, and/or a Subnav area 350, for example, as illustrated in FIG. 13. The origin of the term "Mast" is from newspaper and magazine design; it refers to the top of the first page of a publication. In a web site, this area may be a logical place to position the main directory navigation, as seen by web surfers. Alternatively, if the user's web site carries advertising, the Mast area 325 may be a place where advertisers prefer to place banners. Optionally, the user may place a logo in, for example, the first 100 pixels of height on the page, as an alternative to Logo area 330. As such, the Mast area 325 may be prime real estate that may be advantageously be utilized.

For practical reasons, there may optionally be a separate template for the "Subnav" area to allow for easier entry and manipulation to this area in the page. If so, to modify it, the Subnav Manager 305 may be used.

An optional Template Manager 355 may, for example, include an Archive form 360, an Import form 365, a Modify form 370, a New form 375, a Switch form 380, and/or an Object Defaults form 385. The Archive form 360 may be used to export a template to a template archive. Optionally, the archive may be a public area available to all web management system customers. In such a case, an archived template would be in the public domain. It may be possible, and even desirable, to block access to the Archive form 360 with appropriate user security measures, such as a Users Manager, described hereinbelow, to prevent accidental export of the template to the public domain. With the Import form 365, the user may tap into the template archive.

A template may be modified as, for example, a regular HTML layout or other suitable format. The Modify form 370 may link the user to a list of available standard or user-created templates. The user advantageously need only select the template to modify by, for example, clicking on its link to bring up a contents window containing the template's source code. The Modify form 370 may also contain a short-cut that allows a user to change an item, such as mast color/highlight, positioning and/or the color of a text link in the sub-directory navigation system. The Modify form 370 may include a graphic chart that explains a sample template construction, as shown in FIG. 13.

Figure 15:
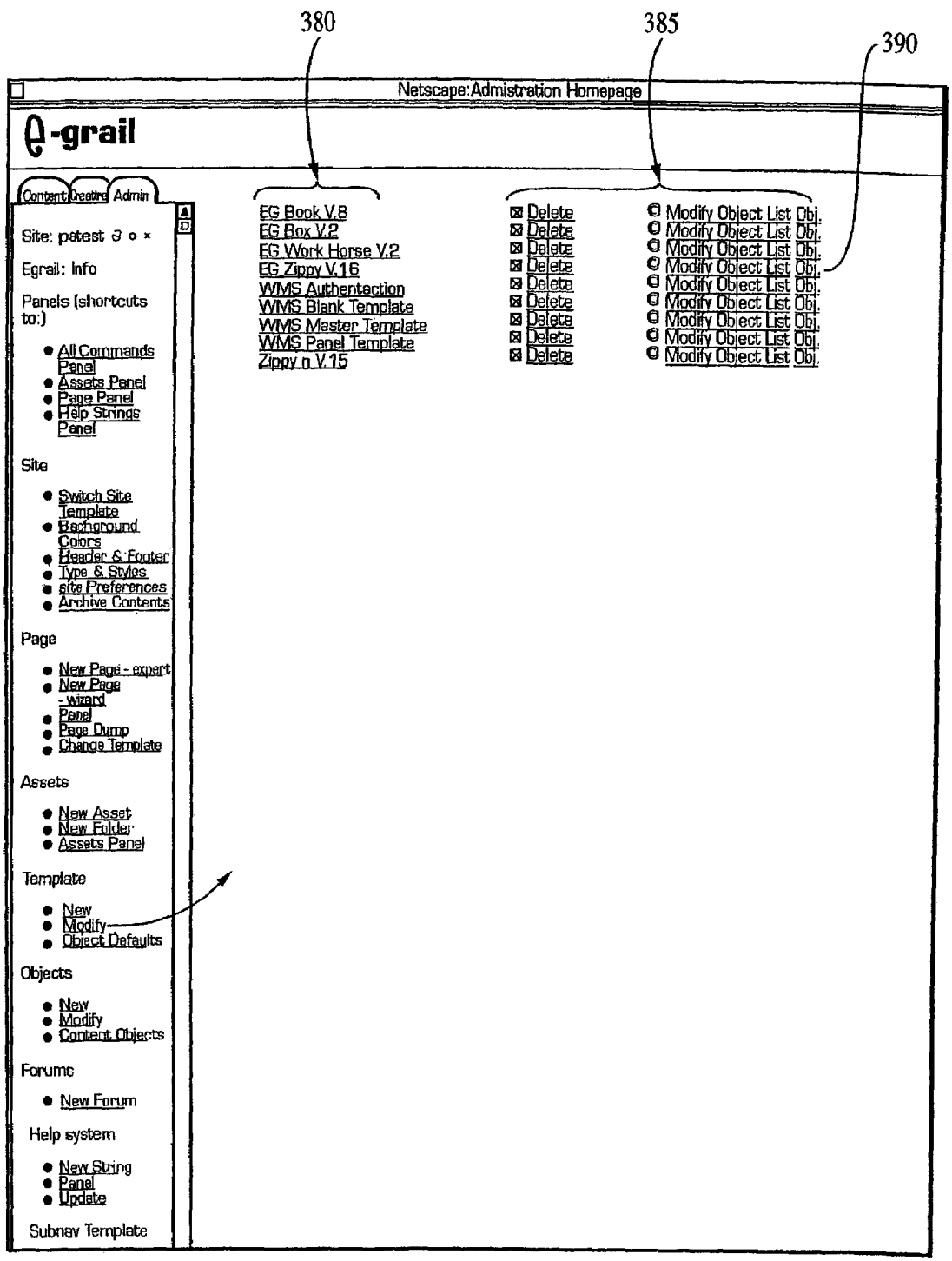
FIG. 15 is a screen display of a Modify template form.
Figure 16:
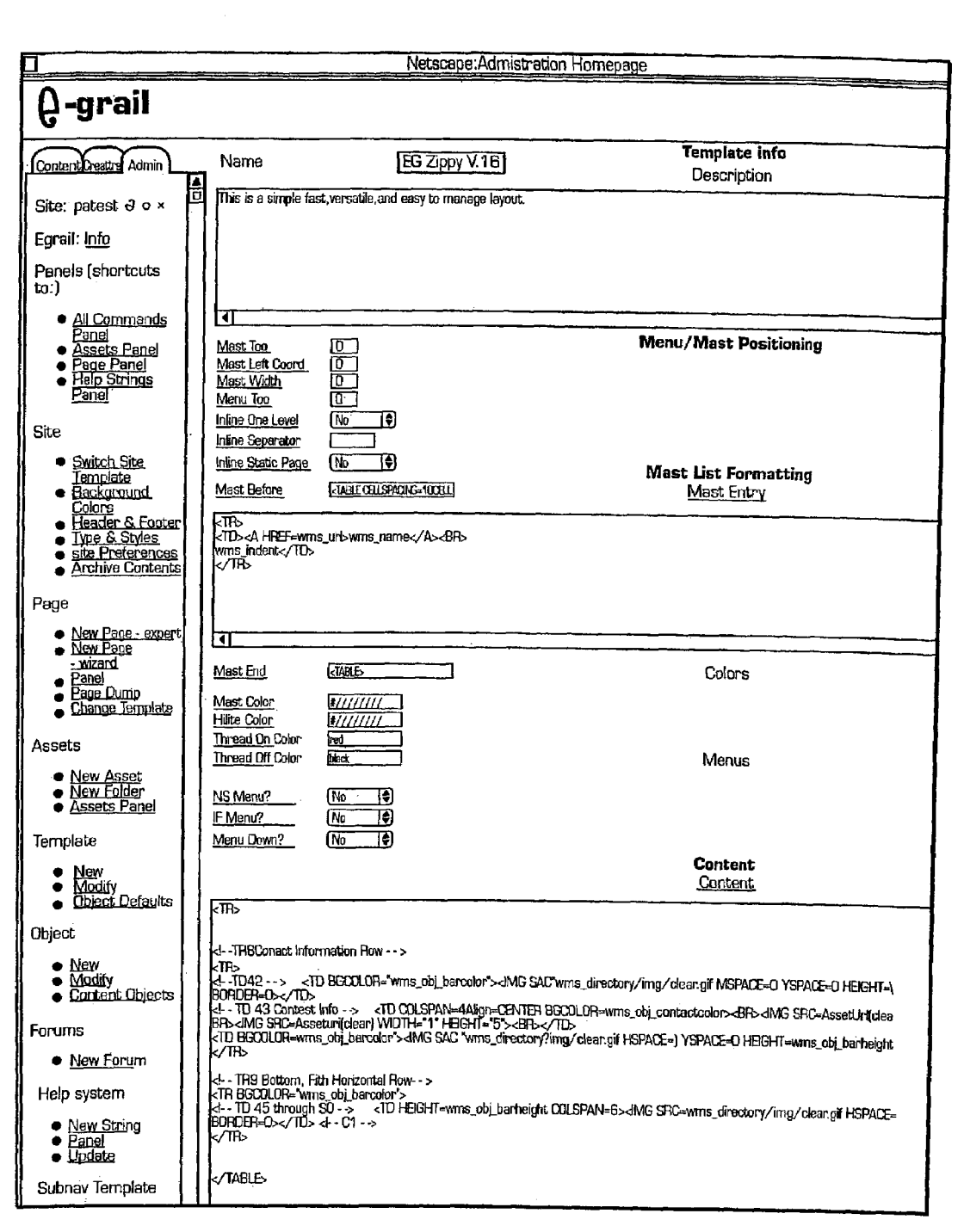
Figure 17:
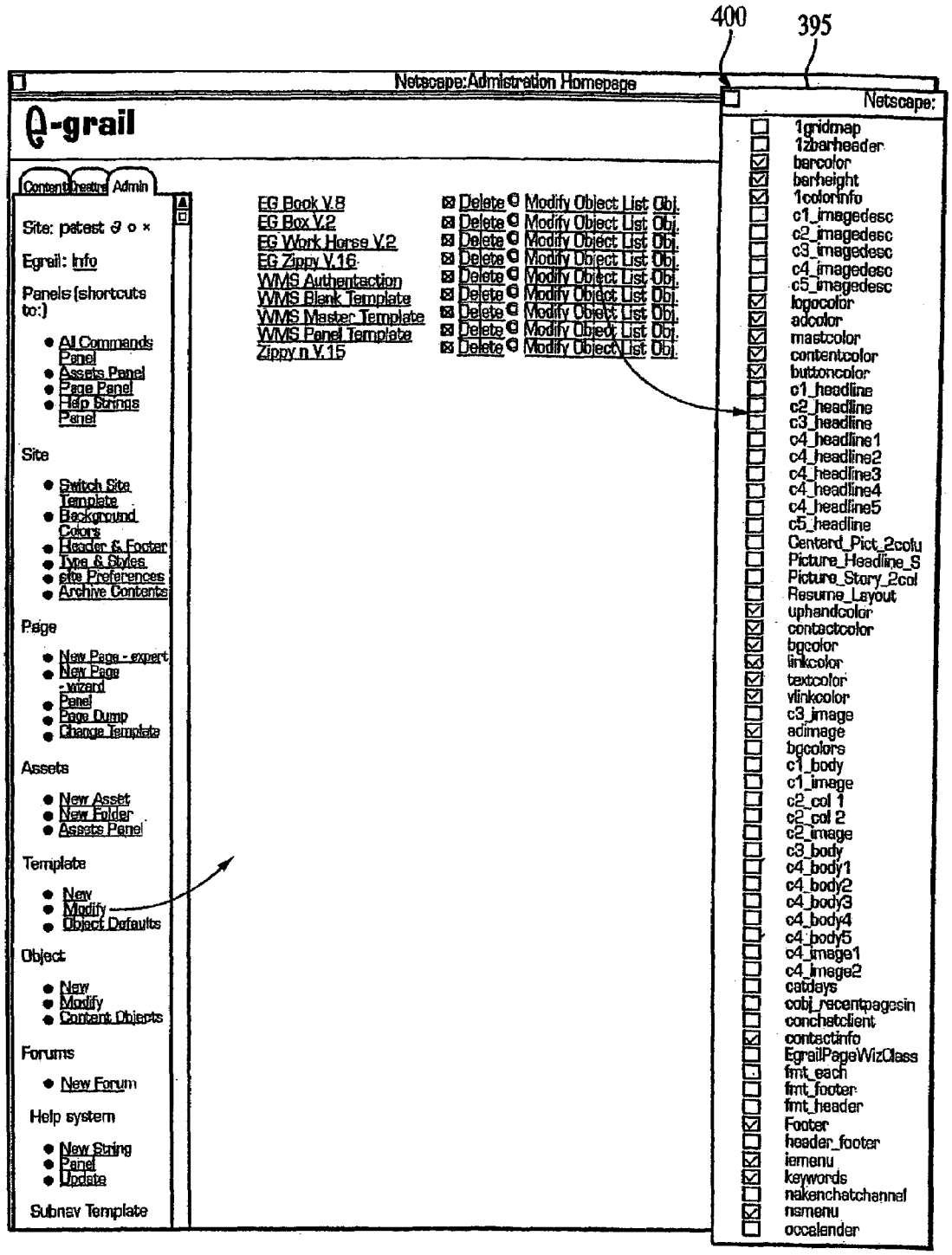
FIG. 17 is a screen display of a sample list of templates and an object list associated with one of the templates.

By way of illustration, the Modify form 370, in operation, may be used as follows. The user may click on the Modify form 370 hot link. A list of available templates may be shown to the user. For example, FIG. 15 shows a list 380 of nine available templates, such as EG Zippy V.16 template, upon clicking the Modify form 370 hot link. If a user clicks on the EG Zippy V.16 template hot link, a form may be provided, for example, as shown in FIG. 16, which may enable the user to modify the template's source code and various template attributes. Alternatively, referring to FIG. 15, beside the list 380 of available templates may be common user or designer functions 385. Among these functions may include a Modify Object List hot link 390. Clicking on this hot link 390 may, for example, provide a list of objects available to the selected template. As shown, by way of example, in FIG. 17, a list 395 of objects available to the EG Zippy V.16 template may be shown. Optional check boxes 400 or selectable bullets, for example, may indicate which available objects are actually present or shown in the template. A checked object may be removed by, for example, "unchecking" the check box associated therewith. Similarly, adding an object to a template may include "checking" the check box associated therewith.

The New template form 375 may be used to enter template content code. To create a new template a user may use an HTML editor of choice or other editor to create a layout, and embed parsable tags into the layout wherever needed. Optionally, the instant web management system may include its own HTML or other standard editor.

The Switch template form 380 may be used to switch between templates. Using the Switch form 380, the user may select the template to be switched (A) and the template to switch to (B). Then, all of the pages using template (A) will be switched to template (B). For greater versatility, the user may also apply the change only to a selected hierarchy, by applying the switch only to a "parent" page and/or its siblings, for example.

The Object Defaults form 385 may be used to set or cancel default objects in one or more selected templates.

Users

Optionally, the web management system 30 may advantageously include a plurality of security levels. The first security level may refer to a user level. It allows internal users to access only those parts of the administrator features and site areas that they have been authorized to enter. This may, for example, be accomplished through the use of, for example, a "Users" directory or form. The second security level may be at the system level. It may allow a webmaster or site administrator to control access to the web server 20, guarding it against improper use by unqualified or unauthorized personnel. Advantageously, this feature may safeguard against hackers, for example, attempting to enter the user's system. Optionally, the web management system 30 may not allow any files to be created outside their proper or authorized areas.

To this end, an optional Users or Users Access Manager 405 may, for example, provide control over who can access a web site through the "back door" by specifying which members of the user's production team can access various components of web site administration.

The User Manager 405 allows for any possible combination or hierarchy of user access without getting in the way. It may optionally scale from single user profiles to multiple team access across many departments.

The User Manager 405 may optionally be customized to provide, or to deny users access to one or more, up to every component of the user's web site on an individual or group basis. The User Manager 405 may be used to streamline the web site management process by forming user groups, e.g., writers, editors, designers, engineers, etc. In conjunction with the user groupings, the user may apply access "levels" that are rank-based, e.g., visitors, members, premium members, contractors, employees, managers, etc.

For example, with a two selector arrangement, it may be possible to assign and provide instant access to, for instance, an "editor" level and a "contractor" level for an outside person doing editing work and ensuring that he will only be able to enter those parts of the site that pertain to his fields of expertise. Advantageously, it may be possible to modify the access privileges up to a specific section in a specific page.

Figure 26:
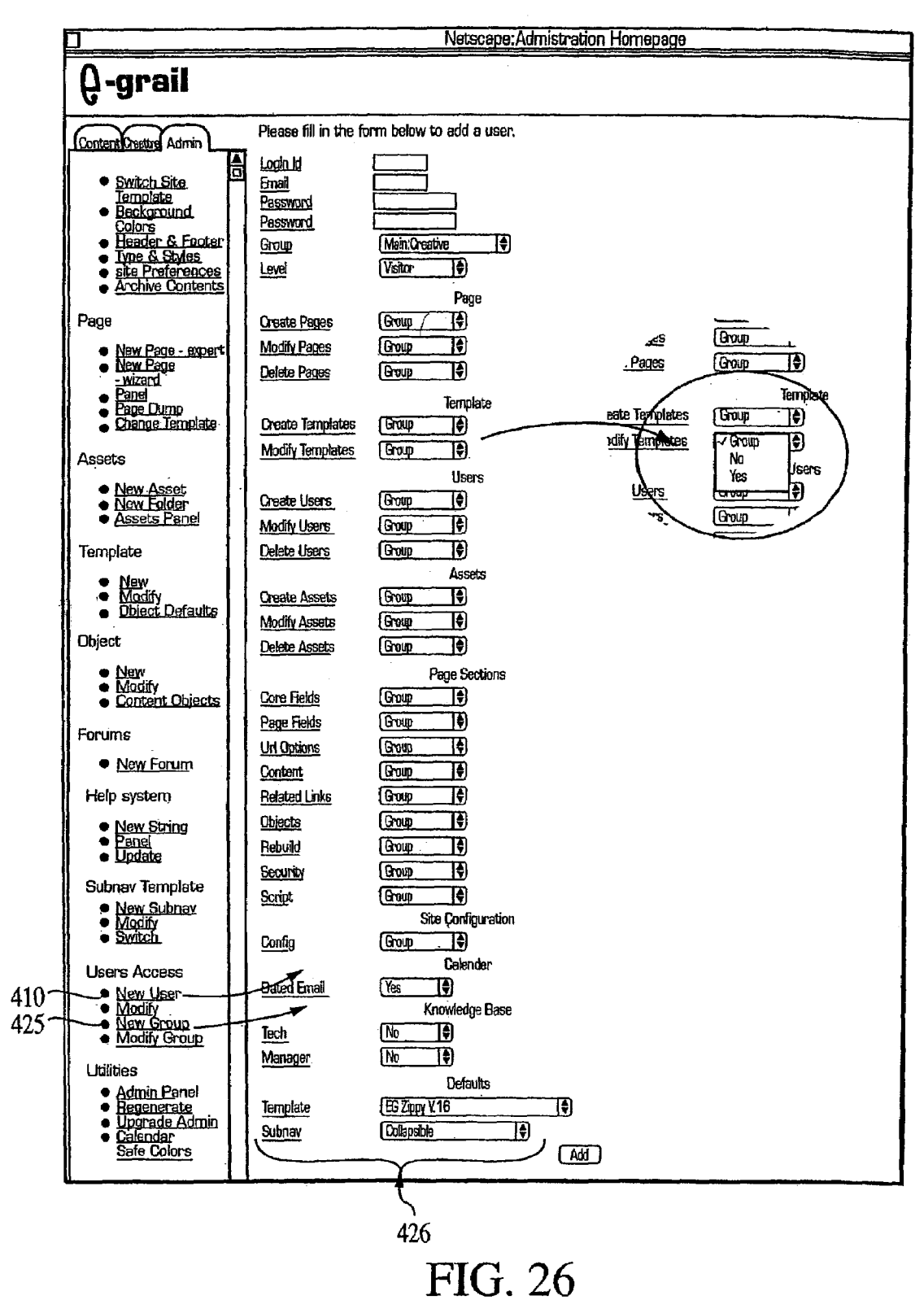

The User Manager 405 may, for example, include an Add User or New User form 410, a Modify or Modify Users form 420, a New Group form 425, and/or a Modify Group form 415. In the Add User form 410, it is possible to tailor a specific access privilege for an individual user. The Modify form 420 may be used to modify existing group access and/or user access. Using the New Group form 425, group access may be tailored in the same or similar manner as access to an individual, wherein instant access, to all members of a group that fit that individual's profile, may be created. Referring to FIG. 26, by way of example, if a user clicks on the New User form 410 and/or the New User form 425, a modifiable list 426 of user access attributes may be provided. Optionally, the user access attributes may include a "Group" access value, which may include default access settings for a given group. To add flexibility, the list 426 permits the creation of a user within a group having certain access attribute settings that deviate from the default settings for the group.

Utilities

The web management system 30 may include a number of utilities available to a user for making the creation and/or management of web sites as painless as possible. One or more of the following utilities may be included in an optional Utilities Manager 430.

Calendar: An optional Calendar feature 435 may allow a user or a group of people to identify and track key dates in a web site production or management schedule. This feature may be helpful when teams are working on more than one project simultaneously.

Clone: The Clone feature 440 may be used to clone the user's site and to create an identical twin site. The cloned site can be used for many purposes from performing creative experiments to creating mirror sites. Optionally, this feature may be found in the Configurations form or menus 85.

Color Calculator: A Color Calculator feature 445 may be used to select background or test colors by translating, for example, an RGB (red/green/blue) color to, for example, a hexadecimal color.

Info: An optional "Info" feature 450 may give a user information on which version of the web management system they are using and when it was last modified.

Multiple Edits: An optional Multiple Edits feature 455 may allow a user to "dump" the entire content of a site into one text file, wherein global contents may be edited with a standard word processor optionally, this feature may be included in the Page Manager 230.

Regenerate or Reload: The web management system 30 may generate part or all of the at least partially static pages from the database 50, when changes are made to the site. In this way, both server and database load are greatly reduced.

Regeneration may be automatic or user-initiated via a Regenerate feature 460. During regeneration, various scripts embedded in the contents may be parsed, i.e., detected, activated, and/or processed by the instant web management system. Optionally, this feature may be included in the Page Manager 230.

Regenerate Navigation or Rebuild Navigation: In some cases, when no changes have been made to the contents, for example, of a web page, such as, when pages have been deleted or hidden, it is sufficient to select a Regenerate Navigation feature 465 to distribute the changes throughout the directory structure. Optionally, this feature may be included in the Page Manager 230.

Report: An optional Report feature 470 may allow the user to run a variety of site management reports on the user's web site. Reports include, for example, the largest object files, the newest pages, the oldest pages, the pages by owner, the pages by structure, the largest assets, the oldest assets, the newest assets, the assets by owner, and/or the most frequently visited pages, and any combination thereof.

Illustrative Method of Creating a New Web Page

To create a new web page, a user may click on the "Add a Page" form 235, for example. An "Add a Page" form 235, such as shown, by way of example, in FIG. 18, may appear and may include entries for the page's attributes and location. Some or all of following fields and instructions may be included to help the user fill in the form to create a new web page.

Name

The Name field 475 may include the name that may appear throughout the site's sub-directory navigation system as the web page's name.

Title

The Title field 480 may include is the name that appears at the top of the browser screen. Optionally, it may be longer and more descriptive than the page name in the Name field 475.

Parent

By selecting a parent in a Parent field 485, the user may fix the page's relational place in the web site. Optionally, if the user creates a page without a parent, it may, for example, become a directory by default.

URL

Using a URL field 490, a user may define a URL path to the created web page, such as, /pagename.html or an internal path, such as, /directoryname/pagename.html.

Optionally, if the user forgets to enter the initial "/" in the URL, the web management system 30 may insert it for the user. Optionally, if the user accidentally enters two periods together, the web management system may automatically remove the extraneous period. That is, the web management system may include known common typing errors and automatically check for and correct them. There need be no change to the name, path or URL, if the user changes the page's location in the site. Although two or more pages can share the same name, their URLs must, however, all be unique. The user may also enter an external name and create a link to another web site as part of the navigation. The user may use, for example, the full path name in this case.

Description

The Description field 500 may include a short metafile containing a short description of the page.

Owner

An Owner field 505 may contain the e-mail address or addresses of the owner, or person who should receive e-mail messages when this web page is modified. Although such notification is useful, the site owner, for example, may not want to be deluged with messages if hundreds of changes are made on the page every day.

Sort priority

Priority refers to the web pages' order of appearance in their sub-directories. Pages may be sorted, for example, by number, and then by name. Pages with the same number may be sorted alphabetically. Pages with lower numbers may, for example, appear higher on the lists in navigation. The web management system 30 may number its pages from, for example, one to twenty, with one being the highest priority. Numbers greater than twenty are acceptable. Of course, alternative orderings are also acceptable. For example, the largest number may have the highest priority. A Sort Priority field 510 may include the web page's priority within the sub-directory navigation hierarchy.

Subnav

A Subnav menu 515, related to the Subnav feature discussed above, may allow the user to select among different types of sub-directory navigation, the local navigation optionally found at the left of the web page. The user's choices may include collapsible, indented subnav (non-collapsible), and no subnav. The user may also create a new style in the Subnav Template Manager 305 and it may be added to this list of choices. The default may, for example, be set in the user settings or in the Preferences or Configuration menus 85.

Template

The Template field 520 may include a document that controls the basic "look and feel" of the pages in a site. As discussed above, different templates may be used in the site to accommodate special purposes. The user may switch between templates here. The user may create as many templates as the user wants, without slowing the site down from the perspective of a web surfer.

Image

The user can use graphic elements including artwork and/or special font treatments in the navigation area or where the logo may appear. If the user wants to replace an existing mast image, for example, the user may load a new image into asset management and select it from an Image field 525.

Forums

A user may attach an interactive posting environment or forum to any page by selecting a forum in a Forums field 530. To create a forum, the user may use the Forums Manager 100, as described above.

Attach Asset Folder

An Attach Asset Folder 535 may allow the user to attach a listing of a folder to a page. This listing may be similar to a Browse feature in the Assets Manager 60, but may be limited to a view of the folder selected or attached. If a user is not logged in or does not have proper access, he may not be able to modify or delete these assets.

External Link

An External link field 540 may permit a user to select "Yes," if the user is using an external URL. Optionally, this field may be set automatically, if the user enter a URL starting with http:/; https:/; ftp:/; telnet:/; gopher://, for example. Plainly, as other file transfer or scripting standards evolve, this field may be updated to reflect the changes.

URL Method

The URL method field 545 may determine whether the web management system 30 will open this page in the same browser window (optionally, a default), a new browser window, a help window, or a panel window.

Content

A Content field 550 may enable a user to enter the page's contents in a content graphical window 555 or other standard user-entry means. The user may compose the user's HTML-formatted text here, or in any HTML editor and simply copy into the content window 555. When the user updates a page, the same content window may appear for editing purposes. If scripting is disabled, standard steps may be taken to remove embedded scripting, such as by using PHP or ColdFusion scripting tools.

Cat

A Cat field 560 refers to "category." This menu may create links to related topics. When other pages related to the same categories are created, a list of "Related Links" may optionally be cross-referenced automatically.

Advantageously, the list of "Related Links" may be an important extension of the sub-directory navigation system because the list may offer a user current and relevant items that may fall within his path of interest. For a commercial or publishing site, the user may, for example, make it a habit to enter this field with a new item whenever the user finishes creating a page. As the user's site grows, the user may find the list to be a useful resource.

New Cat

A New Cat field 565 may, for example, allow a user to create a new object category containing a subject related to the content of the user's page.

Keywords

A Keywords field 570 may, for example, set the meta-tag keywords, which are used by most standard search engines to locate this page. Keywords may include a sample page object.

Show

A Show field 575 may determine whether a web page is visible to a web surfer. The default may, for example, be set to "Yes." If the user wants to hide a page in site navigation, the user may set it to "No." This may be a handy feature when the user want to work on a replacement page, but also wants to keep the original in place until the user completes work on the replacement page.

Group

A Group field 580 may be used to select which group will have access to this page's administration. If the user has not formed groups, a default setting for the Group field may be access to all.

Make Page

When adding a page, the user has the option of generating that page so that it will show up immediately as a static page, or simply entering it into the database and regenerating the entire site at a later time, which may be a convenient time-saver when creating multiple pages. If the user sets a Make Page field 585 to "No," the user's new page may be stored in the database 50 and made into a static page only after the user manually regenerates the page. Set at "Yes," the user's page may be generated automatically.

Rebuild Navigation

When set to "Yes," a Rebuild Navigation field 590 may will automatically rebuilds all navigational elements, when the user's page is updated. Set at "No," revisions of the page may not be made in the sub-directory navigation system. Advantageously, this may speed up the page creation and revision process.

Illustrative Methods of Updating an Existing Web Page

For example, there may be one, two, or more ways to edit an existing page. The following alternative ways are intended to be exemplary, and non-limiting.

I. A user may prefer the Update a Page form 252, as shown, by way of example, in FIG. 19, in the Page Manager 220, if only one page needs to be altered.

II. Alternatively, the user may opt for the Page Panel 250, when a number of web pages need to be altered. The Page Panel 250 may, for example, give the user fast consecutive access to any page in the site.

Illustrative Method of Managing Assets

Figure 20:
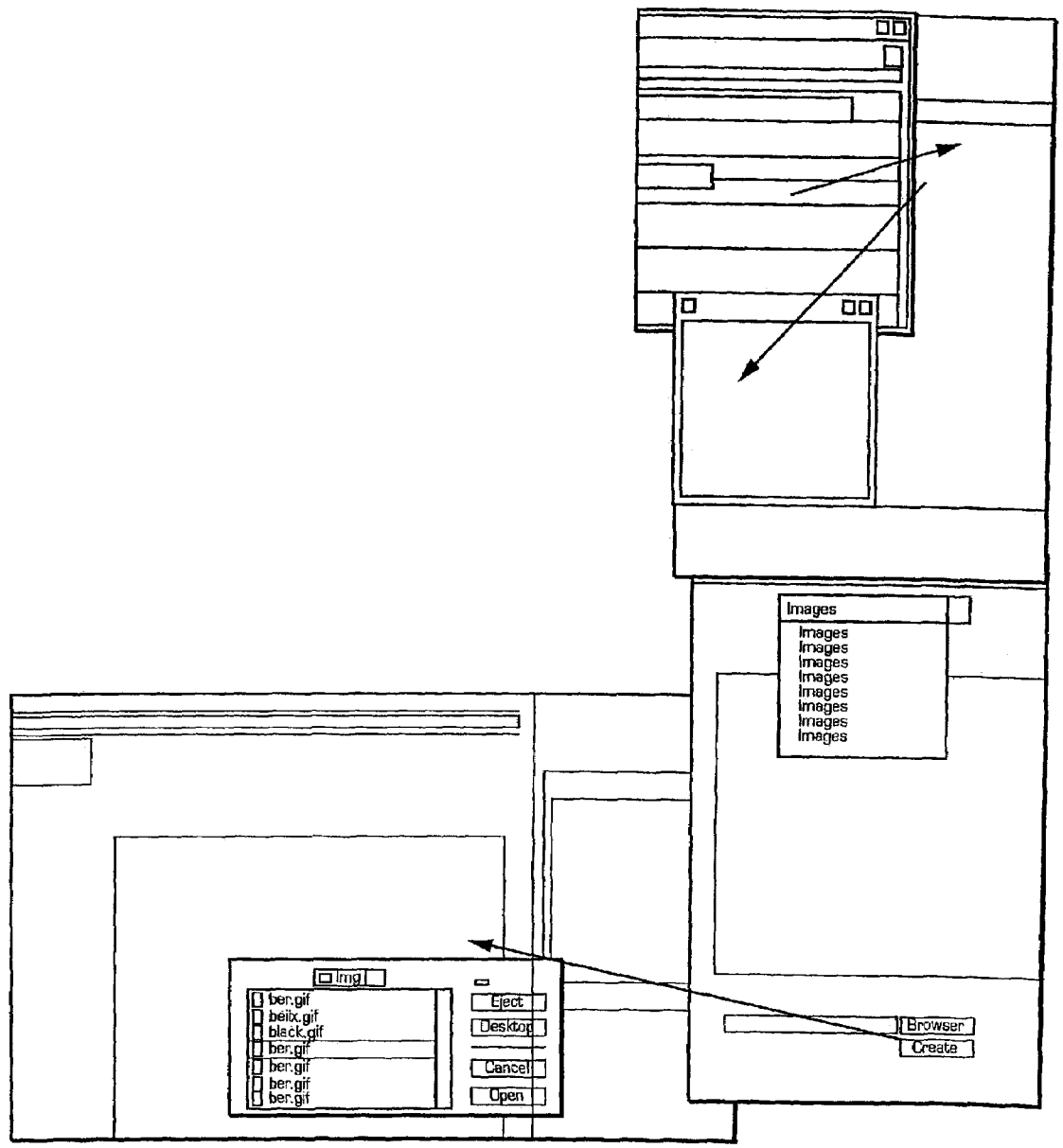
FIG. 20 is a succession of screen displays for managing assets.

Asset management provides the web management system users with a system to organize assets, from text files to graphic images. By way of illustration, referring to FIG. 20, to start using the Asset Manager 60, the user may, for example, perform the following steps:

I. The user may click on the New Folder 70 to create a new assets folder. The user may give it a short name, describing its contents, and nest it where the user sees fit. For example, as in FIG. 20, an optional folder, named Gif and containing GIFs, may be nested in a folder named Images.

II. The user may invoke the asset "Panel" and may see the user's folder name therein. The user may then click on the Gif folder, in this example.

III. The panel may now be switched to show the contents of the user's (still empty) folder. The user may click on the "New" link to add a file.

IV. The user's browser page may, for example, show a form for renaming, describing and/or uploading a file to the user's web server 20. Optionally, only folders and images under the Images folder in Assets may show up on the "Update an Asset" form, in this example.

Illustrative Method of Specifying an Asset

The user can use the following functions in any contents template or objects to specify an asset:

The most commonly used assets are images (standard GIF and JPEG files). The HTML tags that connect an image to a page specify the image name, path and usually, size.

Image (Asset Name)

Figure 21:
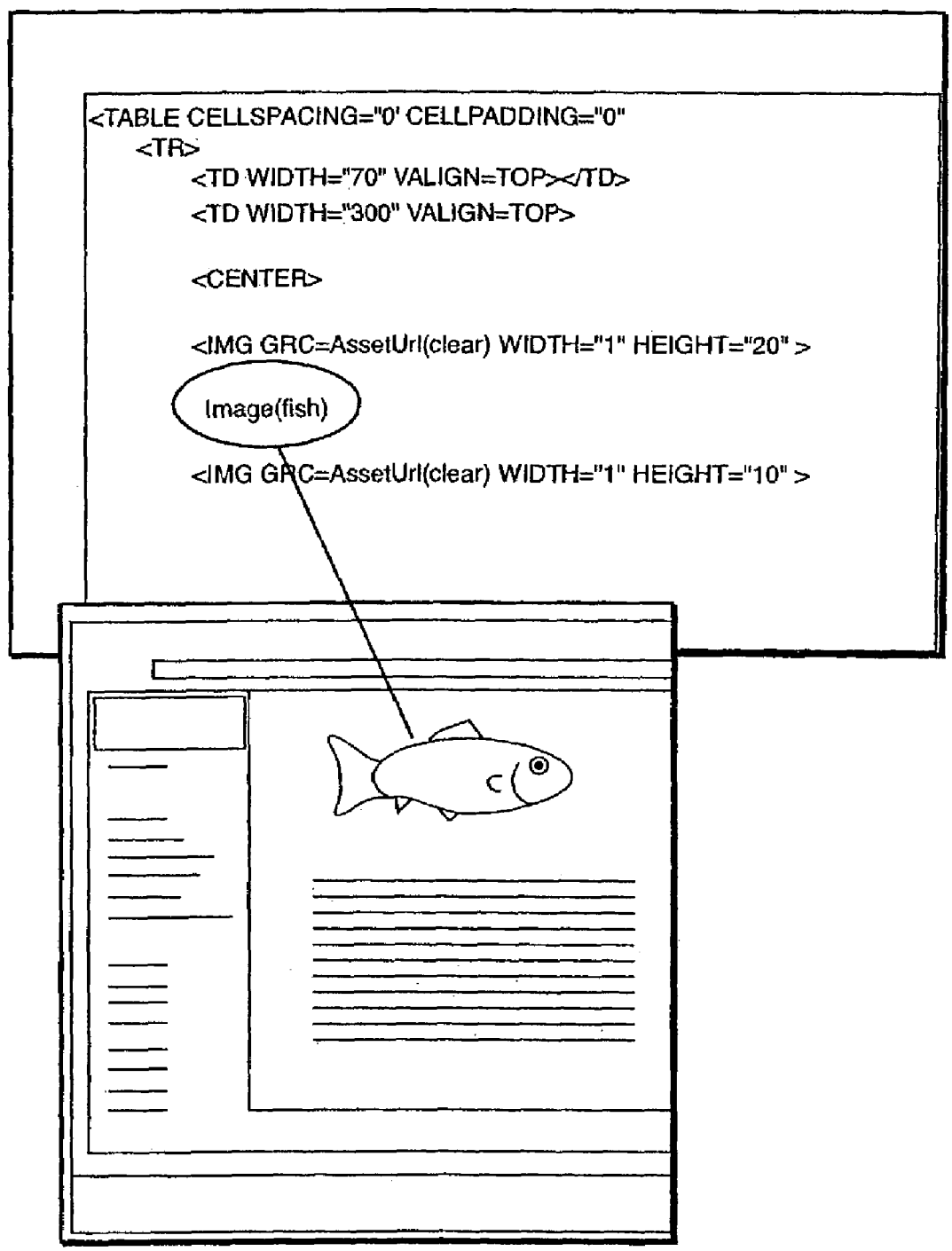
FIG. 21 is a screen display of an image tag.

By using this simple tag, the web management system 30 may connect the user's image and/or calculate its size. For example, referring to FIG. 21, an image of a fish may have a tag, Image(fish). Optionally, when the user updates the image through the Assets Manager 60, the web management system 30 may automatically recalculate the image size, if it has been changed. As long as-the asset name remains the same, the user may use any file name to replace it. For example, if the name of the asset is "employee-picture" and it contains an image "Joe.gif" to replace it with new image, such as, "Jane.gif" the user need only upload the new image to the specified asset. The user may regenerate the web page or the web site, after replacing the image.

AssetUrl (Asset Location)

Applying this tag or form, a user may specify a path to the user's asset. A user may thus connect assets that download or "pop open" a separate window or application. This tag may be used as a part of a standard HTML tag: <A HREF="AssetUrl (the user's asset name)"</A>

ImageUrl (Asset Location)

Figure 22:
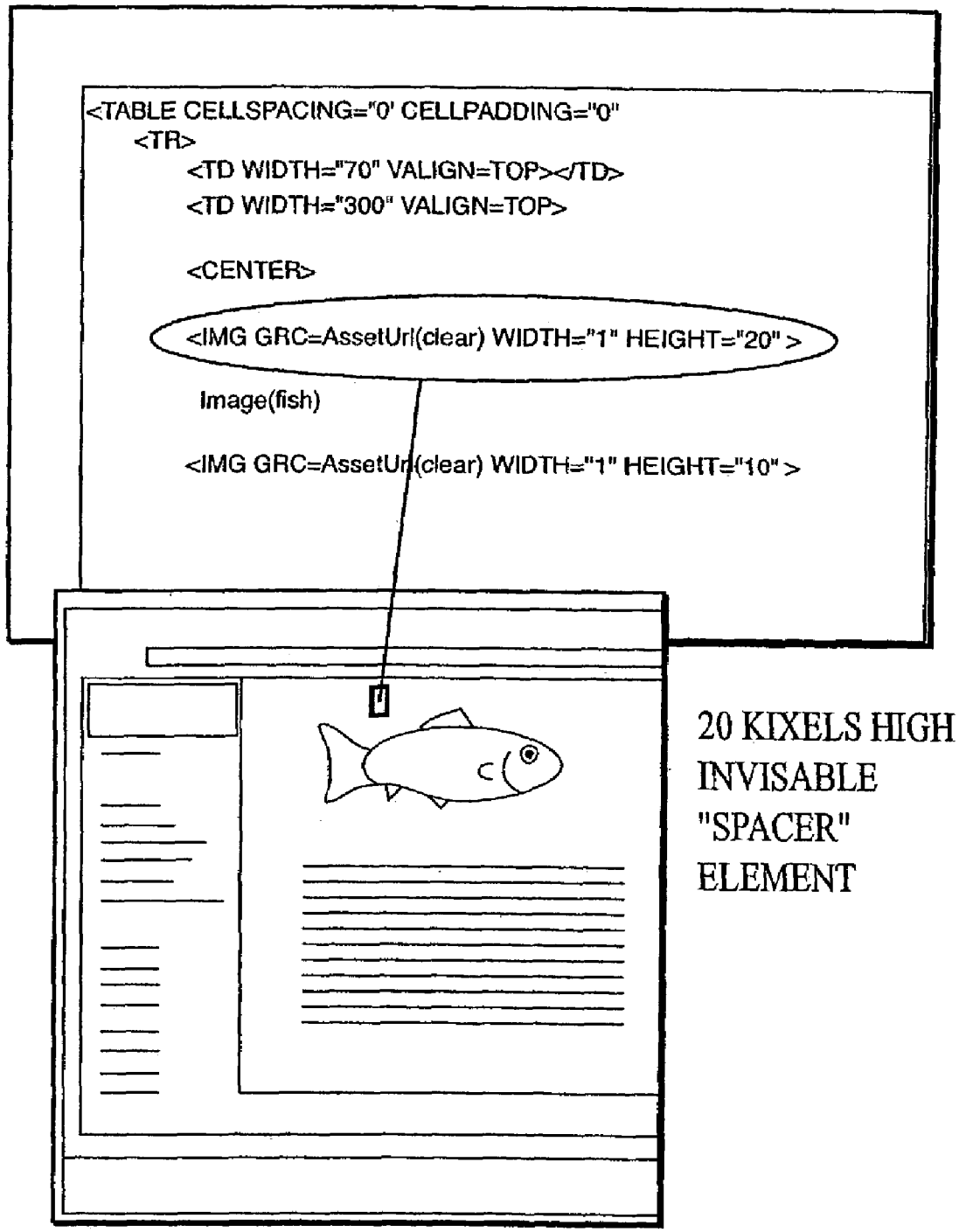
FIG. 22 is a screen display of an image URL tag.

A user may apply this tag to specify a unique path to the user's asset, instead of naming it (in case of a naming conflict) or when the user want to size the user's image arbitrarily, as in the case of a spacing element. Referring to FIG. 22, this tag may be used as a part of a standard HTML tag: <IMG SRC=ImgeUrl(clear) WIDTH="1" HEIGHT="10">

ImageHtmlDim (Asset Location)

A user may apply this tag to produce the user's image dimensions, for example, height and/or width, optionally automatically.

ImageHeight (Asset Location)

This tag may be used to produce the user's image height.

ImageWidth (Asset Location)

This tag may be used to calculate and to produce the user's image width as a number.

The argument for the above tags or functions may include an asset location or the name of the asset. An asset location may include the path of the folders the user must open to get to the asset followed by the name. The format for the location may be very specific. Optionally, the default path may, for example, begin with: Assets::Images. So, advantageously, the user need not include that in the path. Rather, the remaining path need only be specified. As such, the format, for example, may include:

Folder1::Folder2::Folder3:: . . . FolderN::ImageName

Using the Assets Manager 60 or asset management, in general, according to the instant invention, may be especially beneficial in situations of team work. However, if the user prefers not to use it, the user may alternatively use standard FTP, HTML, and/or URL path conventions in the appropriate template. Or, the user may use the external URL of the Asset Manager and use the above tags or functions.

Illustrative Methods of Migrating Legacy Structures

A user may desire to migrate existing relational databases and current web-based applications into the new web management system format. Three alternative, illustrative ways of performing this task are as follows:

I. For example, a user may include links to those applications in the sub-directory navigation.

II. The user may incorporate the templates used by the application into the web management system 30 to allow for continuous updates of the layout.

III. Alternatively, the web management system 30 may maintain the page(s) for the application, and transform them into some server-side scripting language via standard Cold Fusion or PHP scripting techniques.

Alternative Environments

In an alternative embodiment, the above-mentioned computer network may include a virtual private network (VPN), thereby taking advantage of existing PSTN infrastructure while providing a secure and private environment for information exchange regarding resource usage. Advantageously, data sent from the VPN is encrypted, thereby enhancing the privacy of customers. That is, because the VPN includes a tunneling protocol, the instant invention effectively may use the Internet as part of a private secure network. That is, the "tunnel" is the particular path that a given company message or file might travel through the Internet.

In another embodiment, the above-described computer network may alternatively include an extranet, wherein customers may securely exchange large volumes of resource usage data using a standard data exchange format, for example, Electronic Data Interchange. To this extent, an extranet may enable customers to share news of common interest, for example, aggregated resource usage, exclusively with partner companies.

It should be understood that although standard graphical user interface browsers have been discussed, standard text-only browsers, such as Lynx, may be used for UNIX shell and VMS users. Users of such text-only browsers may download comma-delimited ASCII files of, for example, their usage data.

Figure 23:
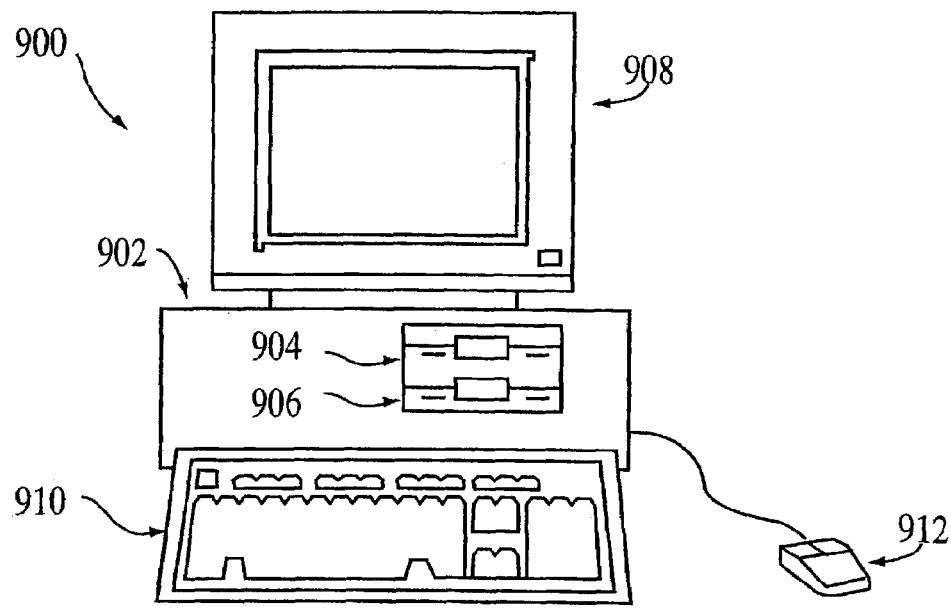
FIG. 23 is an illustrative computer and peripherals.

For completeness, FIG. 23 is an illustration of a computer system for implementing the computer processing in accordance with a computer implemented embodiment of the present invention. The procedures described above may be presented in terms of program procedures executed on, for example, a computer or network of computers.

Viewed externally in FIG. 23, a computer system designated by reference numeral 900 has a computer 902 having disk drives 904 and 906. Disk drive indications 904 and 906 are merely symbolic of a number of disk drives which might be accommodated by the computer system. Typically, these would include a floppy disk drive 904, a hard disk drive (not shown externally) and a CD ROM indicated by slot 906. The number and type of drives varies, typically with different computer configurations. Disk drives 904 and 906 are in fact optional, and for space considerations, may easily be omitted from the computer system used in conjunction with the production process/apparatus described herein.

The computer system also has an optional display 908 upon which information is displayed. In some situations, a keyboard 910 and a mouse 902 may be provided as input devices to interface with the central processing unit 902. Then again, for enhanced portability, the keyboard 910 may be either a limited function keyboard or omitted in its entirety. In addition, mouse 912 may be a touch pad control device, or a track ball device, or even omitted in its entirety as well. In addition, the computer system also optionally includes at least one infrared transmitter and/or infrared received for either transmitting and/or receiving infrared signals, as described below.

Figure 24:
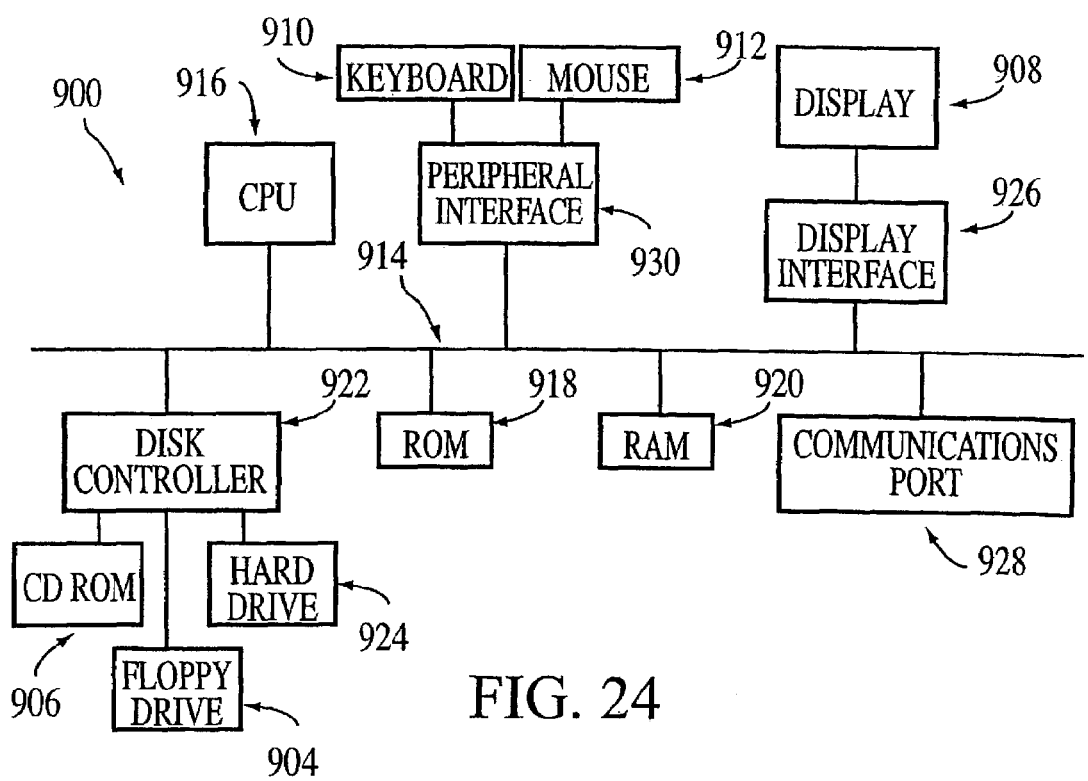
FIG. 24 is a schematic of the computer and the peripherals.

FIG. 24 illustrates a block diagram of the internal hardware of the computer system 900 of FIG. 23. A bus 916 serves as the main information highway interconnecting the other components of the computer system 900. CPU 916 is the central processing unit of the system, performing calculations and logic operations required to execute a program. Read only memory (ROM) 918 and random access memory (RAM) 920 constitute the main memory of the computer. Disk controller 922 interfaces one or more disk drives to the system bus 914. These disk drives may be floppy disk drives such as 904, or CD ROM or DVD (digital video disks) drive such as 906, or internal or external hard drives 924. As indicated previously, these various disk drives and disk controllers are optional devices.

A display interface 926 interfaces display 908 and permits information from the bus 914 to be displayed on the display 908. Again as indicated, display 908 is also an optional accessory. For example, display 908 could be substituted or omitted. Communications with external devices, for example, the components of the apparatus described herein, occurs utilizing communication port 928. For example, optical fibers and/or electrical cables and/or conductors and/or optical communication (e.g., infrared, and the like) and/or wireless communication (e.g., radio frequency (RF), and the like) can be used as the transport medium between the external devices and communication port 928. Peripheral interface 930 interfaces the keyboard 910 and the mouse 912, permitting input data to be transmitted to the bus 914.

In addition to the standard components of the computer, the computer also optionally includes an infrared transmitter and/or infrared receiver. Infrared transmitter may be utilized when the computer system is used in conjunction with one or more of the processing components/stations that transmits/receives data via infrared signal transmission. Instead of utilizing an infrared transmitter or infrared receiver, the computer system may use a low power radio transmitter and/or a low power radio receiver. The low power radio transmitter may transmit the signal for reception by components of the production process, and may receive signals from the components via the low power radio receiver. The low power radio transmitter and/or receiver are standard devices in industry.

Figure 25:
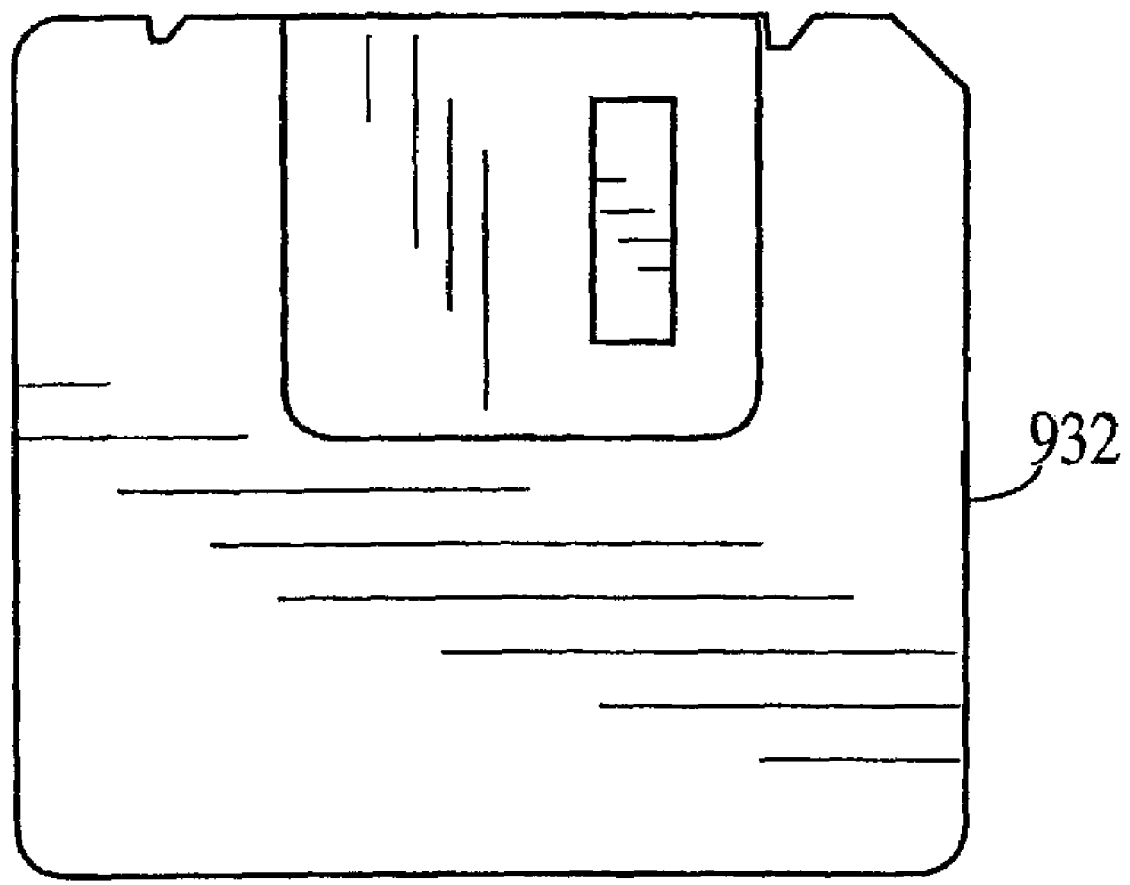
FIG. 25 is an illustrative memory medium.

FIG. 25 is an illustration of an exemplary memory medium 932 which can be used with disk drives illustrated in FIGS. 23 and 24. Typically, memory media such as floppy disks, or a CD ROM, or a digital video disk will contain, for example, a multi-byte locale for a single byte language and the program information for controlling the computer to enable the computer to perform the functions described herein. Alternatively, ROM 918 and/or RAM 920 illustrated in FIGS. 13–15 can also be used to store the program information that is used to instruct the central processing unit 916 to perform the operations associated with the production process.

Although computer system 900 is illustrated having a single processor, a single hard disk drive and a single local memory, the system 900 may suitably be equipped with any multitude or combination of processors or storage devices. Computer system 900 may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture*, by William Stallings, MacMillam Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference. Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference.

In alternate preferred embodiments, the above-identified processor, and, in particular, CPU 916, may be replaced by or combined with any other suitable processing circuits, including programmable logic devices, such as PALs (programmable array logic) and PLAs (programmable logic arrays). DSPs (digital signal processors), FPGSs (field programmable gate arrays), ASICs (application specific integrated circuits), VLSIs (very large scale integrated circuits) or the like.

GLOSSARY

Abstract

This may include a brief description of a page. Information here can be used to describe the page in an internal administrative environment (such as a site map). The description can also serve as a handle for site administrative purposes.

Alias

Alias may include an abbreviated name for a page. This field can be left blank.

Directory

This may include the web site's main directory name. This field may be in a safety mode and, optionally, the user may not be able to modify it.

Allow Startup

This feature may will allow commands to be entered into a web page's URL. The default is set to "No" and should stay that way, unless there are some technical or PHP-related functions to be performed.

Build Navigation

The default may be set to rebuild files when all modifications are done.

Can Delete Trees?

"Trees" may refers to the hierarchical offspring, or "family tree," of a page. The default, may be set to "No," preventing the user from mistakenly deleting a page that has offspring. If set to "Yes," and the user deletes a page, the user will also delete its offspring.

Cat

Cat may permit a user to select an objects category, wherein an object may be the result of two (or more) intended references. When other pages related to the same categories are created, the list of "Related Links" may be updated and changed automatically.

Code Table

This is the code table (list) the user want to associate with an object/field/form.

Contact Email

A user may enter an e-mail address for the forum administrator who should receive error or status messages about the forum.

Content

A user may enter all HTML-formatted contents for the page. The user may paste in contents prepared by any standard HTML editor.

Create Forum Password

A user may use this to set the password that authorizes someone to create a forum.

Database

This may include the name of the database where a web site's files are stored. If this field is in safe mode, optionally, the user may not be able to change it.

Default Subnav

The default subnav specifies what type of sub-directory navigational element the user want to use. The user may choose no subnav, collapsible subnav, or indented subnav.

Description

This is a brief description of a page. Information here may be picked up by internal search engines. The description may also serve as a handle for site administrative purposes.

Document Root

This is the path to the web server that contains this site.

Forum Key

The forum key is a unique identifier for a forum, designed for internal use. It can be up to eight characters in length, with no spaces.

Forum Name

A user may specify a name for the user's forum.

Forum Password

This is a password that may be used by personnel authorized to administer the forum, delete messages, change flags, etc.

Global Object

If this field is set to yes, then the associated object may appear in the site-wide object listing, and will be valid for all pages. Advantageously, only one copy of it need be stored.

Image

A user may use a graphic element in the main navigation mast (usually at the top of the screen) if the user want to replace the default style. The user may enter the name of the graphic image to appear in the main navigation mast.

Image Width

Image Width is the width of the graphic image (see "Image") in pixels. The total image width used in the main navigation mast optionally should not exceed the mast-width itself. The image height need not have a limitation.

Keywords

A few key words may assist external search engines in locating this page. This field can be left blank.

Mast Hilite Color

This specifies the highlight color of the main navigational bar (usually at the top of the page). The hilite color may show, when the user passes over the area with the user's mouse ("mouse over"). The color may be specified in a standard HTML color code.

Make Page

This may add a page to the user's site. The default is set to "Yes." When the user are updating a page, the user may keep the default. Selecting "No" when updating a page will store the latest revision in the database until the next regeneration, when it will be cached into a static page.

Make Static Pages

This option lets the user create pages that are completely static. It is an option that is useful when creating pages for third parties.

Mast Color

This specifies the color of the main navigational bar (usually at the top of the page), when it is not highlighted. The color may be specified in a standard HTML color code.

Mast File

A Mast File may include PHP code files for configuration of the mast.

Mast Width

A Mast Width is the width of the mast in pixels. The mast may contain the global navigation buttons. It may be placed at the top of the page. Its area may be defined by the distance from the top of the browser screen, the point at which it begins at the left (Top Left) and the mast width.

Menu Depth

The menu depth is the number of levels (not the number of items) the user wants to appear under each directory on the mast. The web management system may handle menu depths up to or greater than five.

Name

Name refers to what the page is called throughout the site's navigation system. The user should try and keep this name short; the user can use a longer, more descriptive name in the "Title" field.

New Cat

This is a standard input text field that allows the user to create a new category of object. It will then create the category and associate the current object with it.

Object Name

This is the name of the object the user will be creating. It must be unique and contain no spaces, tabs, or other non-printable characters. After this object class has been created, the name may be preceded with 'The web management system_obj_'+ and that keyword may be used in future template translations.

Object Title

The object title may include a string that can contain spaces and all types of characters. This field may be displayed on the update form in blue next to the input field.

Owner

A user may enter an e-mail address in this field. When this page is modified, notice will be sent to this address. This is an optional system.

PHP Directory

This is the name of the directory that stores all the standard PHP code files. This field is normally in safe mode; the user optionally may not be able to change it.

Parent

By selecting a parent for this page (click and select from the pop-up), the user place the user's page into the site structure. Optionally, this relative position—as an offspring or a parent—may be automatically maintained by the web management system as the site grows and changes. The user will be able to easily reposition the page through "update a page." When moving a parent page, the user automatically move along all its "children."

Page DB

The Page DB may include an existing database that can be used in the creation of a new site. Once the user chooses a database, the contents thereof may be employed in the new site.

Priority

As a default, pages may be listed alphabetically in navigational structure. The user can alter their priority by assigning a number to each page. The lower the number, the higher its priority in a list. The numbers go from one to 20, with one being first on the list and 20 being last.

Rebuild Navigation

When set to "Yes," this may automatically rebuild the navigation system.

Regenerate Pages

This command may regenerate all the static pages from the database. Since this is a command that can become time-consuming in large sites or with a bad connection, it is possible to set it to "No."

Script Directory

The Script Directory may, for example, be where configuration files are stored. If the site is in safe mode, the user, optionally, may not be able to change it.

Show

This may determine whether or not a page shows. The default is set to "Yes." If the user wants to hide page from showing in site navigation, the user may set it to "No." This is a handy feature when the user is working on a replacement page, but wants to keep the original in place until the user has completed his work.

Show Object

If this is set to "yes," then the object may be shown on all update screens. If it is not, then the object may not be shown, and thus not updatable from the client system.

Subnav

This menu may allow the user to select among different types of sub-directory navigation (the local navigation usually at the left of the screen). The user,'s choices may be: collapsible (the default style), no subnav, and indented (non-collapsible) subnav. The user may also create a new style at the "Subnav" and it may be added to this list.

Template

The template may include a file that controls the basic structure of the pages in this site. Different templates can be used in the site to accommodate special purposes. The user may switch between templates from this page. To add and manipulate existing templates, the user may look into files, for example, with standard htx extensions.

Thread Off Color

This specifies the color of the unselected local navigation links (usually at the left of the screen).

Thread On Color

This specifies the color of the hypertext links in the local navigation area (usually at the left of the screen) when they are selected. The color may be specified in a standard HTML color code.

Timeout

Timeout is the time, for example, in milliseconds, that a pull-down menu will continue to appear after it is no longer selected. Why does the user need timeout? When moving the mouse from one item to another, the selected pull-down menus would collapse instantly without a time delay. The timeout feature keeps the menus from collapsing for the split second it takes to move the mouse from one item to another. The default may be one second (1,000 milliseconds); a possible useful range may be, for example, between 500 to 1500 milliseconds.

Title

Title refers to the name of the page as it appears in the top of the browser window.

Top

Top refers to the measurement in pixels from the top of the page to the top of the mast containing the navigation bar.

Topleft

Topleft refers to the measurement in pixels from the left of the browser screen to the point where the navigation mast starts.

Top Start

Top Start refers to the measurement in pixels from the top of the screen to the point in height from which the pull-down menus start popping.

Type Name

This is the name of the type of asset the user are creating.

URL

The Universal Resource Locator, or address of the page.

URL Method

The URL Method may specify how the user wants the new page opened in a window. The page may be opened a normal window, a help window, or a panel.

The Web Management System DB

This may be the master database for all the web management system sites.

The Web Management System Project Id

This may include the project ID linking a web site back into the master database.

MustSendFile

The user may attach a file when creating an-asset.

NotExist

The asset the user is trying to modify does not exist.

NoSuchEntry

The entry the user is trying to modify does not exist.

EntryExistsAlready

The entry the user is trying to add already exists. Entries must be unique per code table (list)

AlreadyExists

The object the user is trying to create already exists.

NameHasSpaces

The object name the user are creating contains spaces, or other prohibited characters in its name.

What is claimed is:

1. A method of qualifying a user to access and edit an attribute one or more web pages of a web site, the method comprising:
    storing in a database system attributes of web pages of a web site, wherein said attributes comprising content and data relating to presentation of the content;
    storing in said database system associations of said attributes with said web pages of said web site;
    associating users with varying access rights, wherein at feast some of the users acquire access rights to certain ones of said attributes while at least others of said users acquire access rights to certain others of said attributes;
    caching the web pages in a file system;
    receiving a request from one of said users to edit an attribute associated with one or more of said web pages;
    determining whether said one of said users is authorized to edit said attribute by reviewing said access rights associated with said one of said users
    parsing the attributes in the database system to generate partially static web pages; and
    caching the generated web pages in a file system.

2. The method of claim 1, wherein said associating users with said varying access rights further comprises assigning users access rights on an attribute level.

3. The method of claim 1, wherein said associating users with said varying access rights further comprises assigning users access rights through role-based authorization.

4. The method of claim 3, wherein said users are assigned a role comprising at least one of visitor, member, premium member, contractor, employee, manager, user, web master, power user, guest, consultant, writer, editor, designer, engineer, and site administrator.

5. The method of claim 1, wherein said associating users with said varying access rights further comprises assigning users access rights as a member of one or more groups.

6. The method of claim 5, wherein said groups comprises at least one of visitor, member, premium member, contractor, employee, manager, user, web master, power user, guest, consultant, writer, editor, designer, engineer, and site administrator.

7. The method of claim 5, wherein said associating users with said varying access rights further comprises assigning users access rights through role-based authorization.

8. The method of claim 1, wherein said request from said one of said users to edit said attribute comprises at least one of a request to create, update, modify and delete said attribute.

9. A web site management system comprising:
    a file system storing web pages of a web site wherein some of said web pages comprises static web pages;
    a database system storing attributes of said web pages, wherein said attributes comprising content and data relating to presentation of the content;
    a web management system capable of associating users with varying access rights to said attributes of said web pages, wherein at least some of the users are associated with access rights to certain ones of said attributes while at least others of said users are associated with access rights to certain others of said attributes, wherein the web management system receives a request from one of said users to edit an attribute associated with one or more of said web pages, the web management system determines whether said one of said users is authorized to edit said attribute by reviewing said access rights associated with said one of said users the web management system parses the attributes in the database system to generate partially static web pages; and the web management system caches the generated web pages in the file system.

10. The web site of claim 9, wherein said web management system assigns users access rights on an attribute level.

11. The web site of claim 9, wherein said web management system assigns users access rights through role-based authorization.

12. The web site of claim 11, wherein said role-based authorization comprises roles of at least one of visitor, member, premium member, contractor, employee, manager, user, web master, power user, guest, consultant, writer, editor, designer, engineer, and site administrator.

13. The web site of claim 9, wherein said web management system assigns users access rights as a member of one or more groups.

14. The web site of claim 13, wherein said groups comprises at least one of visitor, member, premium member, contractor, employee, manager, user, web master, power user, guest, consultant, writer, editor, designer, engineer, and site administrator.

15. The method of claim 13, wherein said web management system also assigns users access rights through role-based authorization.

16. The method of claim 9, wherein said request from said one of said users to edit said attribute comprises at least one of a request to create, update, modify and delete said attribute.

* * * * *